US010876969B2

(12) United States Patent
Rogers et al.

(10) Patent No.: US 10,876,969 B2
(45) Date of Patent: Dec. 29, 2020

(54) APPARATUS FOR DETECTING FLUORESCENT SIGNALS EMITTED BY SAMPLES

(71) Applicants: ATILA BIOSYSTEMS INCORPORATED, Palo Alto, CA (US); SYNERGISTIC DETECTOR DESIGNS, LLC, Fountain Hills, AZ (US)

(72) Inventors: Arthur H. Rogers, Harrisonburg, VA (US); James T. Alcivar, Fountain Hills, AZ (US)

(73) Assignees: ATILA BIOSYSTEMS INCORPORATED, Palo Alto, CA (US); Synergistic Detector Designs, LLC, Fountain Hills, AZ (US)

(*) Notice: Subject to any disclaimer, the term of this patent is extended or adjusted under 35 U.S.C. 154(b) by 4 days.

(21) Appl. No.: 16/323,244

(22) PCT Filed: Aug. 9, 2017

(86) PCT No.: PCT/US2017/046153
§ 371 (c)(1),
(2) Date: Feb. 4, 2019

(87) PCT Pub. No.: WO2018/031687
PCT Pub. Date: Feb. 15, 2018

(65) Prior Publication Data
US 2019/0187054 A1    Jun. 20, 2019

Related U.S. Application Data

(60) Provisional application No. 62/373,282, filed on Aug. 10, 2016.

(51) Int. Cl.
*G01N 21/64*    (2006.01)
*G01N 21/03*    (2006.01)

(52) U.S. Cl.
CPC ..... *G01N 21/6452* (2013.01); *G01N 21/0332* (2013.01); *G01N 21/6458* (2013.01);
(Continued)

(58) Field of Classification Search
CPC ....... G01N 2021/6419; G01N 21/0332; G01N 21/6452; G01N 21/6456; G01N 21/6458; G01N 21/6486; G01N 2201/0627
See application file for complete search history.

(56) References Cited

U.S. PATENT DOCUMENTS 3,946,239 A    3/1976   Salzman et al.
5,982,534 A *  11/1999  Pinkel ................ G01N 21/6458
                                                        359/387
(Continued)

OTHER PUBLICATIONS

WIPO Application No. PCT/US2017/046153, PCT International Preliminary Report on Patentability dated Feb. 12, 2019.
(Continued)

*Primary Examiner* — Chih-Cheng Kao
(74) *Attorney, Agent, or Firm* — Alston & Bird LLP

(57) ABSTRACT

Various embodiments are directed to a fluorescence reader for assessing a fluorescence intensity of one or more substance samples. The fluorescence reader may comprise a sample support structure for accepting sample wells containing corresponding samples therein, an illumination structure positioned below the sample support structure and configured to illuminate one or more samples positioned within the sample wells, and an imaging structure positioned above the sample support structure and configured to detect a fluorescence emitted by the one or more samples. The illumination structure may comprise one or more reflective perimeter walls, together with the support structure, defining an enclosed illumination cavity, and one or more light sources positioned within the enclosed illumination cavity
(Continued)

and configured to emit light causing the one or more samples to fluoresce.

20 Claims, 9 Drawing Sheets

(52) U.S. Cl.
CPC ..... *G01N 21/6486* (2013.01); *G01N 21/6456* (2013.01); *G01N 2021/6419* (2013.01); *G01N 2201/0627* (2013.01)

(56) References Cited

U.S. PATENT DOCUMENTS

| | | | |
|---|---|---|---|
| 2003/0112432 A1* | 6/2003 | Yguerabide | G01N 21/47 356/317 |
| 2003/0151735 A1* | 8/2003 | Blumenfeld | G01N 21/6456 356/73 |
| 2005/0017191 A1 | 1/2005 | Montagu et al. | |
| 2006/0170918 A1 | 8/2006 | Nishiuma | |
| 2007/0116444 A1 | 5/2007 | Brown | |
| 2008/0095669 A1* | 4/2008 | Kang | G01N 21/6452 422/82.08 |
| 2008/0179539 A1* | 7/2008 | Rasnow | G01N 21/6454 250/458.1 |
| 2008/0241866 A1* | 10/2008 | Korlach | G01N 21/6452 435/8 |
| 2009/0168061 A1 | 7/2009 | Haga et al. | |
| 2010/0261158 A1* | 10/2010 | Nordman | G01N 21/6486 435/6.1 |
| 2015/0102234 A1 | 4/2015 | Gargir et al. | |

OTHER PUBLICATIONS

WIPO Application No. PCT/US2017/046153, PCT International Search Report and Written Opinion of the International Searching Authority dated Oct. 19, 2017.

* cited by examiner

APPARATUS FOR DETECTING FLUORESCENT SIGNALS EMITTED BY SAMPLES

CROSS-REFERENCE TO RELATED APPLICATION

The present application is a US national stage of PCT/US17/46153, filed Aug. 9, 2017, which claims the benefit of U.S. provisional 62/373,282, filed Aug. 9, 2016, each of which is incorporated by reference in its entirety for all purposes.

BACKGROUND

Many substances are detected using fluorescent labels. For example, nucleic acids can be detected by hybridization to labeled probes. One such form of assay involves amplification of a nucleic acid in a sample by a process such as the polymerase chain reaction or isothermal amplification. The amplification product can be detected in real time as it accumulates or as an end point after amplification is completed by hybridization to a labelled probe.

Detecting fluorescent labels requires an excitation light signal and a detector to detect emitted light. However, certain labels may be detectable only when subject to certain excitation signals within certain wavelength ranges (e.g., excitation light signals within certain color ranges). For example, certain labels may be most easily detectable when subject to blue/green excitation signals (e.g., having a wavelength between 495-520 nm), while other may be easily detectable when subject to green/yellow excitation signals (e.g., having a wavelength between 535-556 nm), orange excitation signals (e.g., having a wavelength between 576-601 nm), or red/orange excitation signals (e.g., 646-662 nm). Accordingly, detecting the presence of substances labelled with fluorophores may require that monitored samples are subject to excitation signals having wavelengths falling within defined ranges, while excluding the application of light outside of the defined wavelength ranges.

Moreover, systems for monitoring the luminescence of samples are often configured to monitor signals from multiple samples simultaneously, such as a plurality of samples positioned within respective wells of a multi-well sample plate (e.g., an 8-well sample plate, a 48-well sample plate, a 96-well sample plate, and/or the like). Accordingly, such multi-sample mechanisms are generally configured to provide each sample with corresponding excitation signals having a generally consistent intensity. Such mechanisms therefore generally space the light source a large distance away from the samples to enable the emitted excitation signals to diffuse prior to reaching the various samples. Thus, samples generally directly aligned with the light source receive a similar intensity of excitation signals as other samples positioned at an acute angle relative to the light source.

To add to the complexity of monitoring light emitted from chemical or biologic samples, emitted light measurements may be detrimentally impacted when excitation light is directly detectable by the measurement device. Accordingly, detection devices generally incorporate shielding mechanisms to isolate light emitted by the monitored samples while impeding the detection of excitation light not absorbed by the monitored samples.

Moreover, processes for detection of substances may require to be performed at a defined temperature e or to cycle between defined temperatures, such as in PCR. Accordingly, mechanisms for monitoring the signal from substances in samples may also incorporate temperature control mechanisms, such as heaters, heat sinks, and/or the like.

The inclusion of various temperature control mechanisms, light sources configured for providing excitation signals having a defined wavelength and a consistent intensity among a plurality of monitored samples, and detection devices that are shielded from both the light source and other ambient lights generally requires that the monitoring system occupy a large overall volume, making it generally difficult to operate in laboratories having limited space. Accordingly, a need exists for a light monitoring mechanism configured to enable monitoring of a plurality of samples while minimizing the overall space occupied by the mechanism.

SUMMARY OF THE CLAIMED INVENTION

Various embodiments are directed to a fluorescence reader for assessing a fluorescence intensity for one or more substance samples. In various embodiments, the fluorescence reader comprises a sample support structure defining one or more sample well accepting features each configured to support a sample well configured to contain a corresponding substance sample; an illumination structure positioned below the sample support structure and configured to illuminate one or more substance samples positioned within corresponding sample wells, the illumination structure comprising: one or more perimeter walls, wherein the one or more perimeter walls and the sample support structure collectively define an enclosed illumination cavity and wherein at least one of the one or more perimeter walls comprises a reflective surface; and one or more light sources positioned within the enclosed illumination cavity; and an imaging structure positioned above the sample support structure and configured to detect a fluorescence emitted by the one or more substance samples illuminated by the illumination structure.

In various embodiments, the sample support structure comprises a heater plate configured to heat the one or more substance samples positioned within corresponding sample wells. Moreover, the heater plate may comprise: a metal plate defining a cavity corresponding to each of the one or more sample well accepting features, each cavity extending through the metal plate and having a tapered interior surface configured to contour to an exterior surface of a sample well positioned within the cavity; and one or more heating elements configured to transfer heat to the metal plate. In certain embodiments, the one or more heating elements are resistance heaters.

In various embodiments, the one or more perimeter walls and the heater plate collectively define the enclosed illumination cavity, and the heater plate defines a cavity corresponding to each of the one or more sample well accepting features, each cavity extending through the heater plate such that a bottom surface of a sample well positioned within a cavity is suspended below the heater plate and within the illumination cavity. In various embodiments, the one or more perimeter walls comprise one or more side walls and a floor, and the one or more light sources are positioned within at least one of the one or more side walls. Moreover, in certain embodiments, the one or more light sources comprises one or more first light sources configured to emit light having a first color, and one or more second light sources configured to emit light having a second color. Moreover, the one or more first light sources may comprise one or more first light filters configured to permit the light having the first color to pass into the illumination cavity, and the one or more second light sources comprise one or more second light filters configured to permit the light having the second color the pass into the illumination cavity. In various embodiments, the one or more light sources comprise light emitting diodes.

Moreover, in various embodiments, the imaging structure comprises: an opaque hood forming an imaging cavity collectively with the sample support structure, wherein the imaging cavity prevents light from entering the imaging cavity from the exterior of the fluorescence reader; and an imaging device positioned within the imaging cavity and configured to detect the fluorescence emitted by the one or more substance samples illuminated by the illumination structure. The imaging device may be a Charge Coupled Device camera or a Complementary Metal-Oxide Semiconductor camera. Moreover, the imaging device may comprise one or more light filters configured to selectively permit light within one or more wavelength ranges to be detected by the imaging device. In certain embodiments, the imaging device comprises two or more light filters configured to be alternatively positioned in an active position to selectively permit light within one or more wavelength ranges to be detected by the imaging device while positioned in the active position.

Certain embodiments are directed to a method for assessing a fluorescence intensity of one or more substance samples. In certain embodiments, the method comprises steps for: positioning a sample plate within a sample support structure, wherein the sample plate defines one or more sample wells each containing a substance sample therein, and the sample support structure defines one or more sample well accepting features each configured to support a sample well therein such that a bottom portion of the sample well is suspended within an illumination cavity defined below the sample support structure; illuminating the sample plate by emitting light from one or more light sources into the illumination cavity, wherein the illumination cavity is enclosed by one or more reflective perimeter walls and a bottom surface of the sample support structure; and imaging a top portion of the sample plate by capturing image data from an imaging device positioned above the sample support structure.

In certain embodiments, the method additionally comprises steps for identifying an intensity of fluorescence emitted by substance samples positioned within one of more of the sample wells. Moreover, various embodiments comprise steps for heating the substance samples contained within the one or more sample wells to a desired temperature. In certain embodiments, the one or more light sources comprises one or more first light sources configured for emitting light in a first color and one or more second light sources configured for emitting light in a second color, and the step of emitting light from one or more light sources into the illumination cavity may comprise emitting light from the one or more first light sources in the first color into the illumination cavity. Moreover, in certain embodiments, the one or more first light sources comprise a first light filter configured to permit light in the first color to pass into the illumination cavity and the one or more second light sources comprise a second light filter configured to permit light in the second color to pass into the illumination cavity. In such embodiments, the imaging device may be associated with one or more first light filters configured to permit light in the first color to be detected by the imaging device and one or more second light filters configured to permit light in the second color to be detected by the imaging device, and wherein imaging a top portion of the sample plate may comprise positioning the first light filter in an active position to permit the first light color to be detected by the imaging device.

Moreover, in certain embodiments, the method may additionally comprise steps for associating a portion of the image data with a particular sample well of the one or more sample wells; and determining a fluorescence intensity emitted by the sample in the particular sample well based at least in part on the portion of the image data.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
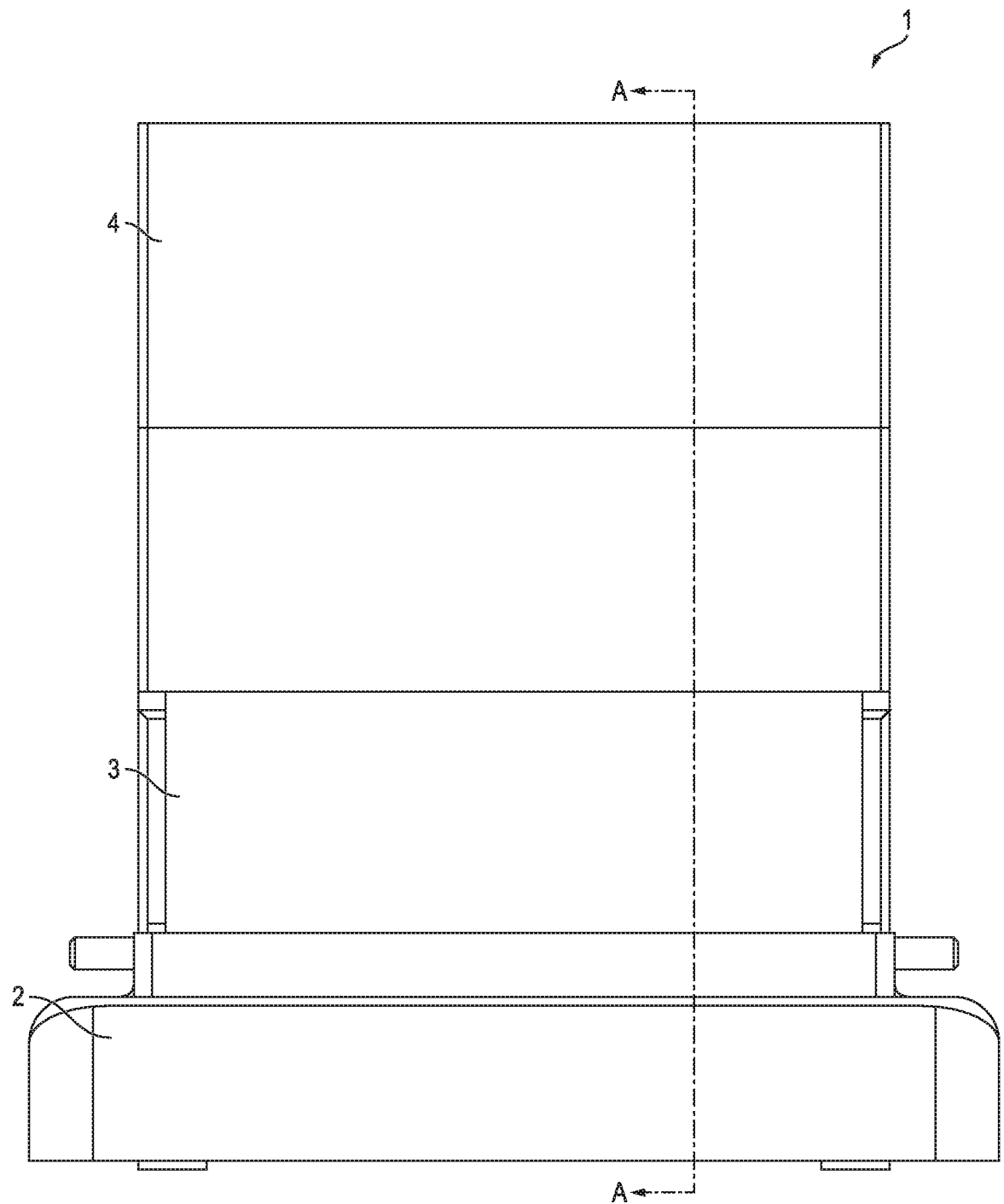
FIG. 1 shows a front view of a closed fluorescence reader according to one embodiment.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to a fluorescence reader for assessing a fluorescence intensity of chemical and/or biologic substance samples. A substance sample means a sample (e.g., biological, clinical chemical) known or suspected to contain a substances, which is to be analyzed for presence and/or amount of the substance, if any. The fluorescence reader comprises a sample support structure configured to support one or more sample wells (e.g., sample wells of a 96-well sample plate) within the fluorescence reader. The sample support structure defines one or more sample well accepting features extending therethrough, each sample well accepting feature configured to accept a sample well therein such that a closed bottom portion of the sample well is suspended below the sample support structure. In various embodiments, the sample support structure may comprise a heater plate comprising a conductive plate (e.g., an aluminum plate) defining one or more apertures corresponding to the one or more sample well accepting features, and a heating mechanism (e.g., one or more resistance heaters) configured to selectively heat the conductive plate. The heater plate may be configured to follow a heating schedule for one or more substance samples, such as a heating schedule comprising one or more high temperature and low temperature time periods having minimal transient periods between reaching steady-state at predetermined temperatures according to the heating schedule.

The sample support structure may be positioned within the fluorescence reader between an illumination structure and an imaging structure. For example, the sample support structure may be positioned above the illumination structure and below the imaging structure, thereby separating the illumination structure and the imaging structure.

The illumination structure may be configured to provide excitation light signals to portions of one or more sample wells suspended below the sample support structure. For example, the illumination structure may comprise a reflective box having a plurality of reflective surfaces therein. Moreover, one or more light sources (e.g., Light Emitting Diodes ("LEDs")) may be positioned in one or more side walls of the reflective box. The one or more light sources may be positioned together with corresponding light filters configured to permit light within predefined wavelengths into the reflective box. In operation, the light sources emit light through the filters and into the reflective box such that light beams having a predefined wavelength are reflected through the reflective box and ultimately into sample wells suspended below the sample support structure (and therefore suspended within the reflective box). Chemical and/or biologic substance samples within the sample wells thereby receive the excitation signals emitted by the light sources such that the substance samples fluoresce such that the imaging structure may detect the emitted fluorescence.

The imaging structure may be positioned opposite the sample support structure from the illumination structure, and is separated from the illumination structure, such that no stray excitation signals (light) is detectable by the imaging structure except through the sample wells. In various embodiments, the imaging structure comprises a photographic camera (e.g., a CMOS chip and/or a CCD chip) configured for capturing images of the one or more sample wells in order to detect the wavelength and/or intensity of luminescence emitted by substance samples positioned within the one or more sample wells.

The fluorescence reader may be selectable sealable to prevent environmental light from outside the florescence reader from entering the interior of the fluorescence reader (e.g., the imaging structure and/or the illumination structure).

Fluorescence Reader

Figure 2:
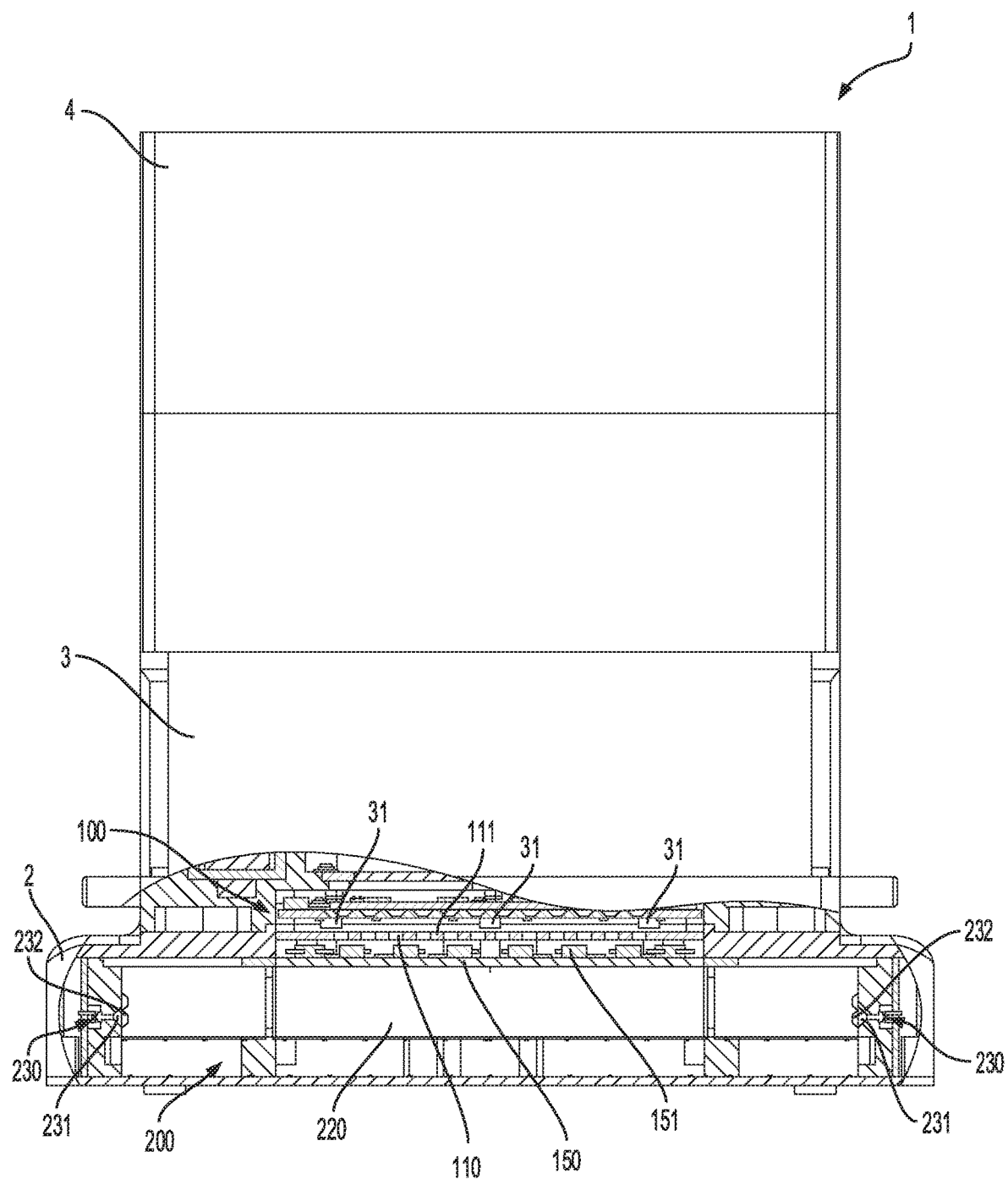
FIG. 2 shows a front cutaway view of a fluorescence reader according to one embodiment.
Figure 3:
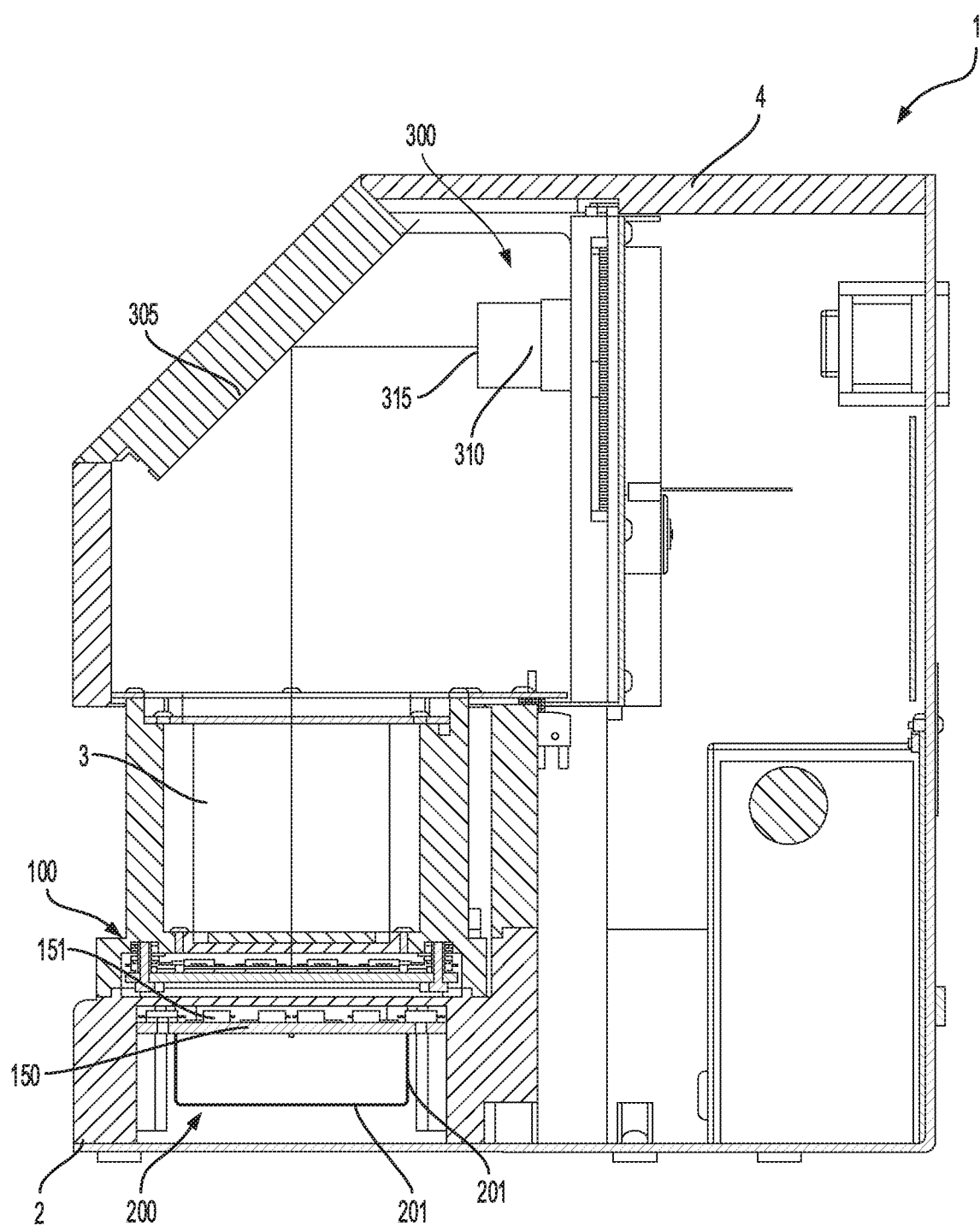
FIG. 3 shows a side sectional view of a fluorescence reader along section line A-A according to one embodiment.

FIGS. 1-3 illustrate an example fluorescence reader according to various embodiments. In the illustrated embodiment of FIGS. 1-3, the fluorescence reader 1 is embodied as a device comprising a base portion 2 and a hood 3 collectively defining a sample interior portion and configured to impede and/or prevent light from entering the sample interior portion. As shown in FIGS. 1-3, the device may additionally comprise a housing 4 encompassing one or more components of the fluorescence reader 1.

As will be discussed in greater detail herein, the device likewise impedes and/or prevents light from escaping the sample interior portion. In various embodiments, the device defining the exterior dimensions of the fluorescence reader may have a volume of at least approximately 1 cubic foot, and having a length, width, and height all less than 14-inches. As just one non-limiting example, the device may have a height of at least approximately 12.5" a width of at least approximately 9.25" and a depth of at least approximately 11.25."

In various embodiments, the exterior of the fluorescence reader 1 may comprise one or more exterior surfaces comprising one or more side walls, top surfaces, and/or a bottom surfaces. Each of the one or more exterior surfaces may comprise an opaque and rigid material, such as a wood, a metal, a plastic, and/or the like.

Moreover, as illustrated in FIGS. 1-3, the fluorescence reader 1 may be configured to be selectably opened, for example, to enable access to the sample interior portion to place substance samples (e.g., sample plates) within the fluorescence reader 1, to perform maintenance on one or more components housed within the interior of the fluorescence reader 1, and/or the like. Accordingly, the hood 3 of the fluorescence reader 1 may be movable relative to the base 2 between a closed configuration and an open configuration. For example, the hood 3 may be secured relative to the base portion 2, the housing 4, and/or the like by an opening mechanism enabling the hood 3 to be moved relative to the base portion 2. For example, the opening mechanism may be embodied as one or more hinges defining a clam-shell opening mechanism enabling the hood 3 to be rotated between the closed configuration and the open configuration. As another example embodiment, the opening mechanism may be defined as one or more linear actuators (e.g., hydraulic and/or pneumatic actuators, electronic solenoids, and/or the like) configured to enable the hood 3 to lift away from the base portion 2 between a closed configuration and an open configuration (as shown in the embodiments of FIGS. 1-3). As just one additional non-limiting example embodiment, the opening mechanism may comprise one or more sliding rails configured to enable the hood 3 to slide between an open configuration and a closed configuration.

As will be discussed in greater detail herein, the hood 3 may be configured to engage at least a portion of a sample plate inserted within the fluorescence reader 1 and thereby apply a force to ensure the sample plate is maintained in a desired configuration within the fluorescence reader 1. For example, the hood 3 may be configured to engage a top surface of the sample plate while moving the hood 3 from the open configuration to the closed configuration. As the hood 3 is moved to the closed configuration, at least a portion of the hood 3 (e.g., plate engagement features 31) may depress the sample plate into a sample support structure 100 (as discussed in greater detail herein) in order to maximize surface contact between the sample plate and at least a portion of the sample support structure 100 (e.g., a heater plate 150). As a specific example, exterior surfaces of various sample wells may be depressed against a corresponding portion of a heater plate 150, in order to facilitate conductive heat transfer between the heater plate 150 and the various sample wells. The hood 3 of the fluorescence reader 1 (e.g., the plate engagement features 31) may be configured to maintain the force depressing the sample plate into the sample support structure while in the closed configuration.

In various embodiments, the fluorescence reader 1 may comprise one or more controllers (not shown) comprising one or more user interfaces comprising an output mechanism (e.g., an LCD display) and/or an input mechanism (e.g., a touch screen display, a keypad, a dial, a switch, and/or the like). In various embodiments, the user interface is configured to enable a user to provide user input indicative of desired operating conditions for the fluorescence reader 1 and/or to provide output data indicative of a current, historical, and/or predicted future status of the fluorescence reader 1. In various embodiments, the fluorescence reader 1 may be configured to be placed in wired and/or wireless electronic communication with an external computing entity (e.g., a desktop computer, a laptop computer, a tablet computing device, a handheld computing device (e.g., a smartphone), and/or the like). Accordingly, the fluorescence reader may be configured to provide output data to the external computing entity. Moreover, in certain embodiments, the fluorescence reader 1 may be configured to receive input from an external computing entity, for example, to define one or more desired operating conditions for the fluorescence reader 1.

As will be discussed in greater detail below, the fluorescence reader 1 may be configured to heat one or more substance samples placed therein and/or to apply excitation light having defined characteristics (e.g., wavelength, intensity, and/or the like). Accordingly, the user interface may be configured to enable a user to select one or more operating characteristics of the fluorescence reader 1.

Sample Support Structure

Figure 6:
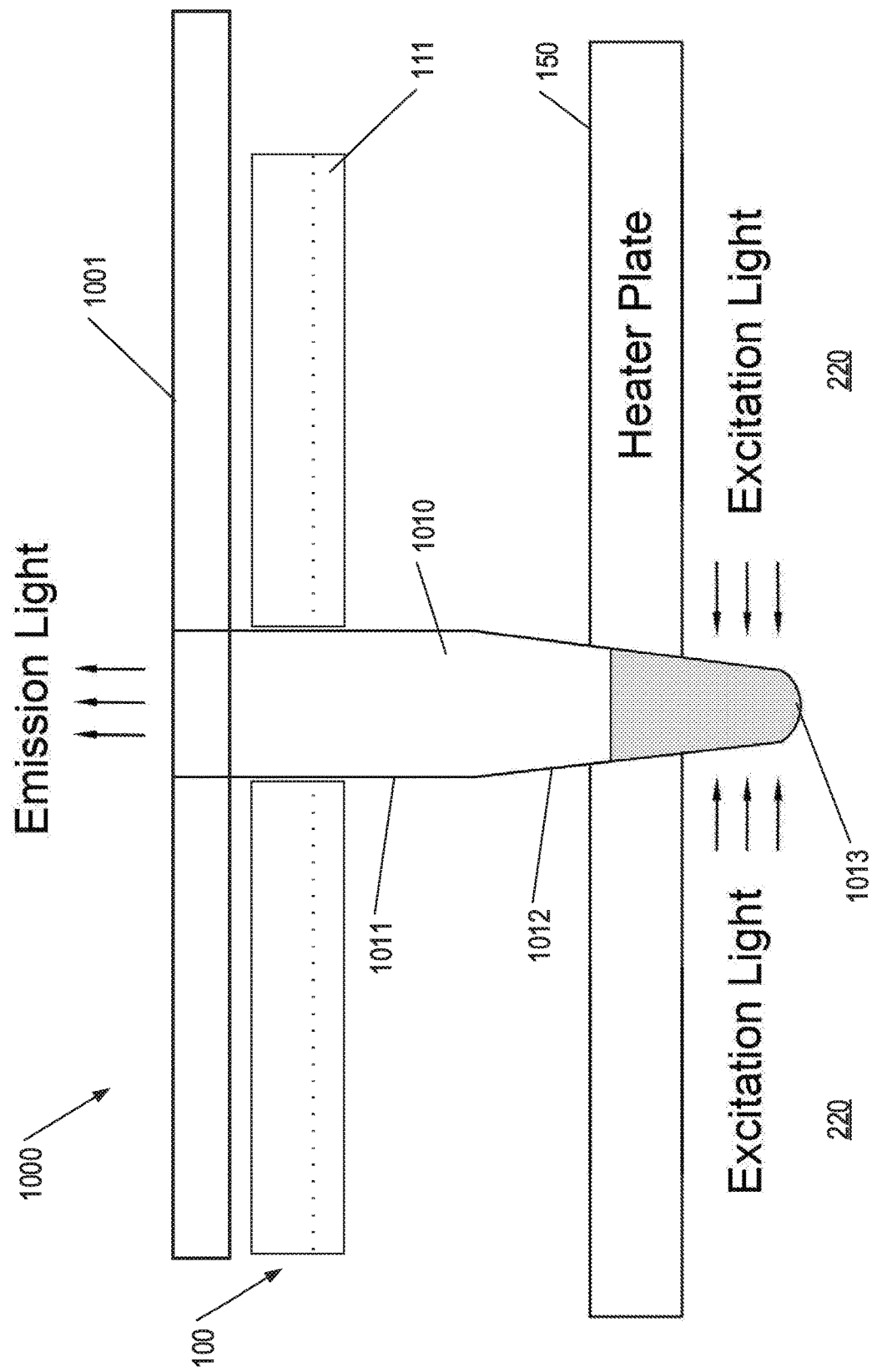
FIG. 6 shows a schematic view of a single sample well according to one embodiment.

As shown in FIGS. 2-3, the fluorescence reader 1 comprises a sample support structure 100 located within the sample interior portion and configured to support one or more sample wells, as shown in e.g., FIG. 6. In various embodiments, the sample support structure 100 may be configured to support one or more sample wells within a rigid sample plate (e.g., a 96-well sample plate).

Figure 7:
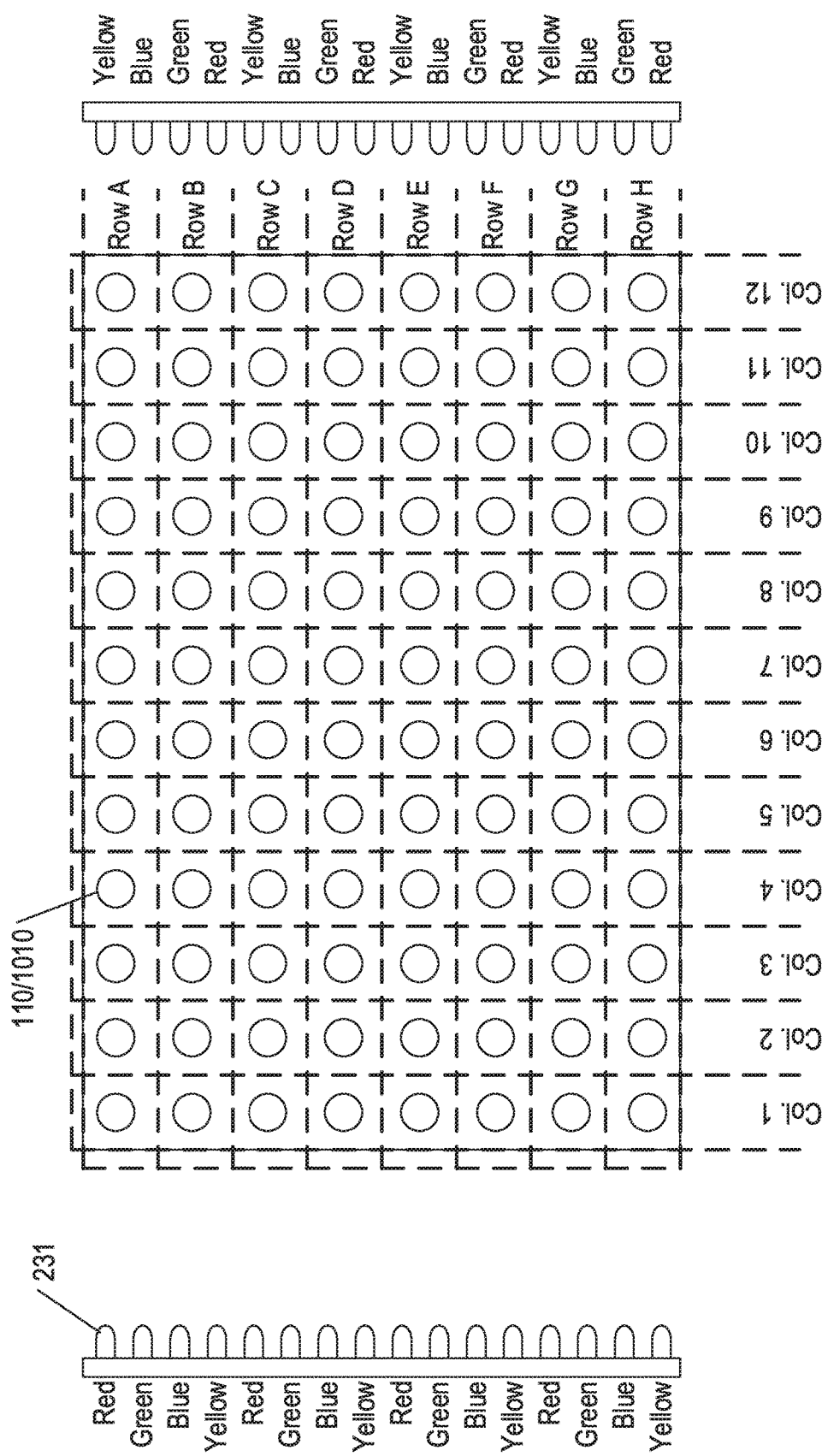
FIG. 7 is a schematic view of a sample well map and illustrating an orientation of light emitters according to one embodiment.

With reference briefly to FIG. 7, which illustrates a schematic view of a sample well positioned within the sample support structure, the sample plate 1000 may comprise a rigid material, such as a plastic material. Moreover, in various embodiments, the sample plate 1000 may be at least substantially clear, such that light passing through the sample plate 1000 is not substantially filtered, polarized, and/or the like while passing through the sample plate. In various embodiments, the sample plates 1000 may define a top portion comprising an at least substantially planar support surface 1001 having a plurality of sample wells 1010 defined therein. Each of the plurality of sample wells 150 may have an open top end (for example, at least substantially planar with the top surface of the support surface 1001), and may extend downward and away from the support surface 1001. In various embodiments, the sample well 1010 may comprise a cylindrical portion 1011 extending away from the open top end. The sample wells may each define an at least substantially conical lower portion 1012 extending away from the cylindrical portion 1011 and a rounded bottom tip 1013. In various embodiments, the conical lower portion 1013 may have an overall length (measured perpendicular to the support surface) of at least approximately 10 mm. Moreover, in various embodiments, the walls of the sample wells 1010 (e.g., the cylindrical portion 1011, the conical portion 1012, and/or the rounded bottom tip 1013) may have a wall thickness of at least approximately 0.5 mm. Each of the sample wells 1010 may be at least substantially uniformly spaced across the surface of the support surface 1001 of the sample plate 1000.

With reference again to FIGS. 2-3, the sample support structure 100 may define one or more sample well accepting features 110 each configured to accept a sample well 1010 nested therein. In various embodiments, the sample well accepting features 110 may be spaced from one another to accommodate a sample plate 100 (e.g., a rigid sample plate) having a plurality of sample wells 1010 defined therein. As just one non-limiting example, the sample support structure 110 may define 96 sample well accepting features spaced to accommodate a 96-well sample plate (e.g., a 96-well microtiter plate). In various embodiments, the sample well accepting features 110 may be equally spaced across the sample support structure 100.

Figure 4:
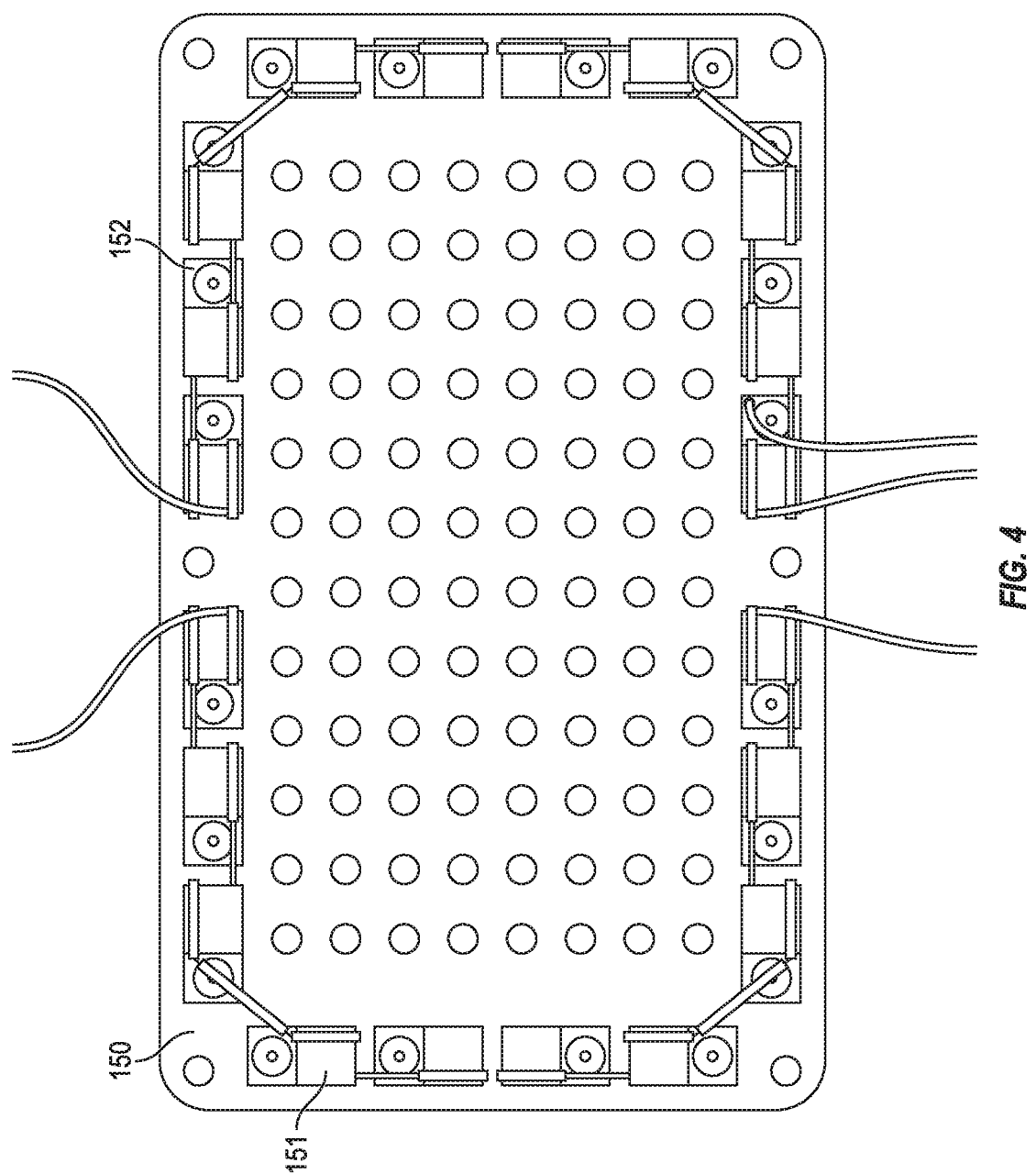
FIG. 4 shows a top view of a heater plate according to one embodiment.
Figure 5:
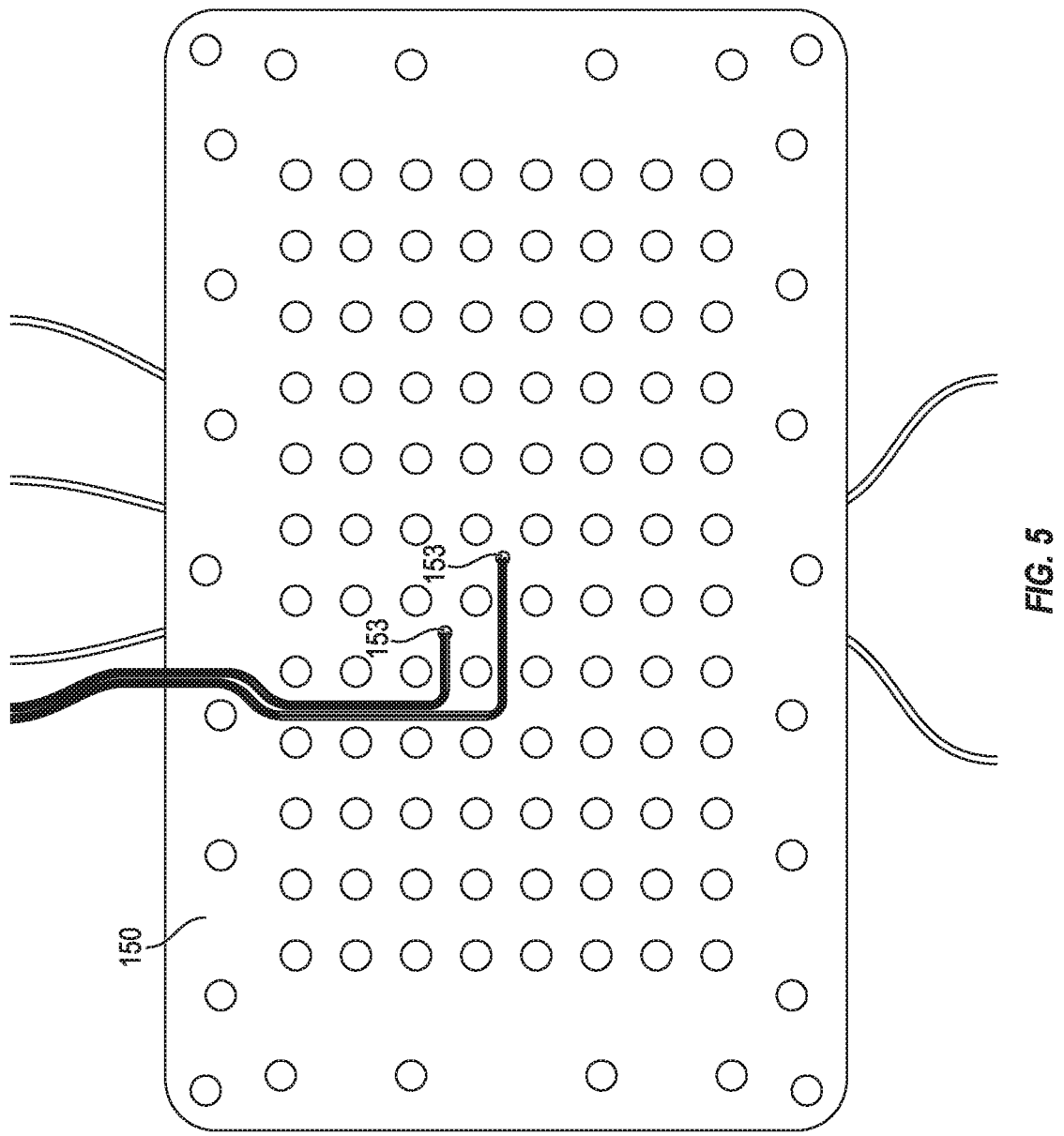
FIG. 5 shows a bottom view of a heater plate according to one embodiment.

In various embodiments, the sample well accepting features 110 may each be configured to accept a sample well 1010 having an exterior diameter of approximately 6-mm therein (e.g., across a cylindrical portion 1011 of the sample well 1010). Accordingly, the sample well accepting features 110 may have an interior diameter of approximately 6-mm. In the illustrated embodiment of FIGS. 2-3, the sample support structure comprises an upper registration plate 111 and a lower heater plate 150. In such embodiments, the sample well accepting features 100 are defined by an aperture extending through the upper registration plate 111 and aligned with a corresponding aperture extending through the lower heater plate 150 (as shown in FIGS. 4-5). Moreover, the apertures of the upper registration plate 111 may be configured to accommodate a cylindrical portion 1011 of sample wells 1010 inserted therein, and accordingly the apertures of the upper registration plate 111 may define a cylindrical interior surface. The apertures of the lower heater plate 150 may be configured to accommodate a conical lower portion 1012 of a sample well 1010. Accordingly the apertures of the lower heater plate 150 may be tapered, having an angled interior surface configured to conform to the angled surface of the conical lower portion 1012 of the sample wells 1010. As discussed herein, the tapered apertures of the lower heater plate 150 may be configured to engage an exterior surface of the sample wells 1010 inserted therein. In various embodiments, a portion of the fluorescence reader 1 (e.g., a plate engagement feature 31 of a hood 3) may be configured to depress the top portion 1001 of the sample plate 1000 against a portion of the sample support structure 100 (e.g., against the upper registration plate 111 and/or the lower heater plate 150), thereby depressing the exterior surfaces of the sample wells 1010 against the interior walls of the corresponding tapered apertures of the heater plate 150 to facilitate conductive heat transfer between the heater plate 150 and the sample wells 1010.

In the illustrated embodiment of FIGS. 2-3, the distance between the upper surface of the upper registration plate 111 and the upper surface of the lower heater plate 150 may correspond to a length of the cylindrical portion 1011 of the sample wells 1010. For example, the distance between the upper surface of the upper registration plate 111 and the upper surface of the lower heater plate 150 may be at least approximately 10 mm.

Moreover, in the illustrated embodiment of FIGS. 2-3, the sample support structure 100 is configured such that a portion of the sample wells 1010 extend below a bottom surface of the heater plate 150 such that a lower portion of the sample wells 1010 are suspended within an illumination structure 200 of the fluorescence reader (as described in greater detail below). In various embodiments, the lower heater plate 150 may have a thickness (measured between the upper surface and the lower surface) of at least approximately 3 mm. In such embodiments at least approximately 6-7 mm of each sample well 1010 extends below the bottom surface of the heater plate 150.

In various embodiments, the upper registration plate 111 may comprise a rigid material, such as a plastic material or a metal material. The upper registration plate 111 may be spaced a distance apart from the lower heater plate 150, for example, to provide heat insulation between the lower heater plate 150 and the upper registration plate 111. In various embodiments, the upper registration plate 111 may be secured relative to the lower heater plate 150 via one or more insulative spacers. In various embodiments, the upper registration plate 111 may have a thickness of approximately 3 mm. Moreover, in certain embodiments, the upper registration plate 111 may define an upper heater plate having a plurality of heating elements (as discussed herein) configured to conduct heat to the one or more sample wells 1010. Accordingly, the upper registration plate may, in various embodiments, have a configuration similar to that discussed herein with respect to the lower heater plate 150.

The lower heater plate 150 may comprise a conductive material, such as a metal. As just one non-limiting example, the lower heater plate 150 may comprise aluminum. As will be described in greater detail below, a bottom surface of the lower heater plate 150 (e.g., which forms a top surface of an illumination structure 200, described in greater detail below), may be polished to have a reflective finish. Moreover, as illustrated in FIGS. 2-4, the lower heater plate 150 may comprise one or more heating elements 151 (e.g., resistance heaters) positioned proximate an outer perimeter of the heater plate 150. In various embodiments, the heating elements 151 may be connected in series, such that a consistent electrical current is applied to each heating element 151. The one or more heating elements 151 may be positioned on an upper surface of the heater plate 150. As just one non-limiting configuration, the heater plate 150 may comprise two 0.75-ohm resistors proximate each corner of the heater plate 150, and twelve 0.5-ohm resistors spaced along each edge of the perimeter of the heater plate 150 to provide a total of twenty resistance heaters 151. In various embodiments, the heating elements 151 may be configured to provide conductive heating to the heater plate 150 to raise the temperature of the heater plate 150, thereby applying heat to the one or more sample wells 1010 positioned therein. In various embodiments, one or more of the heater elements 151 may be secured relative to a heat sink 152 thermally connecting the heater element 151 with the heater plate 150. Accordingly, heat generated by the heater element 151 may be directed to the heater plate 150 via the corresponding heat sink 152. Because the apertures of the heater plate 150 are configured to conform to the surface of the sample wells 1010, heat is directed from the heater plate 150 to the sample wells 1010, for example, via a conductive heat transfer. In various embodiments, at least a portion of the heat may be transferred from the heater plate 150 to the sample wells 1010 via radiative and/or convective heat transfer.

Moreover, as illustrated in FIG. 5, the heater plate 150 comprises one or more temperature sensors 153 (e.g., thermistors, thermocouples, and/or the like) positioned on a surface of the heater plate 150. As illustrated in FIG. 5, the one or more temperature sensors 153 are positioned proximate a center point of the heater plate 150, spaced apart from the heating elements 151. Accordingly, the one or more temperature sensors 153 may be configured to determine when a central portion of the heater plate 150 reaches a desired temperature.

In various embodiments, the one or more heating elements 151 and/or the one or more temperature sensors 153 may be in communication with the one or more controllers, such that the controllers may be configured to selectably activate and/or deactivate one or more heating elements to adjust the temperature of the heater plate 150. Accordingly, the heater plate 150 may be configured to apply heat to one or more substance samples positioned within respective sample wells 1010 in accordance with a heating schedule (e.g., defined via user input to a user interface and/or provided from an external computing entity).

In various embodiments, the heater plate 150 may be configured to reach and maintain a desired temperature of the heater plate 150 for a desired period of time. As non-limiting examples, the heater plate 150 may be configured to reach and maintain a steady-state temperature between about 85-97 degrees Celsius for a predetermined time selected from between about 2-20 minutes; the heater plate 150 may be configured to reach and maintain a steady-state temperature between about 40-75 degrees Celsius for a predetermined time selected from between about 40-120 minutes; and/or the heater plate 150 may be configured to reach and maintain a steady-state temperature between about 75-90 degrees Celsius for a predetermined time selected from between about 3-15 minutes. As discussed in greater detail herein, the controller may be configured to provide an interactive user interface permitting users to select a predetermined temperature profile. For example, the controller may be configured to receive user input selecting one of a plurality of optional temperature profiles. Each of the optional temperature profiles may be presented to user via a user interface, and each of the optional temperature profiles may comprise one or more options for further refining a temperature profile. As just one non-limiting example, the optional temperature profiles may comprise DE-NATURE, AMPLIFY, and KILL. Upon selecting one of the plurality of optional temperature profiles, the user may be enabled to enter a desired temperature within a range of temperatures corresponding to the temperature profile and a desired time period within a range of durations corresponding to the temperature profile. With reference to the above mentioned examples, the DE-NATURE temperature profile may enable a user to select a temperature between about 85-97 degrees Celsius, and to select a duration between about 2-20 minutes; the AMPLIFY temperature profile may enable a user to select a temperature between about 40-75 degrees Celsius, and to select a duration between about 40-120 minutes; and the KILL temperature profile may enable a user to select a temperature between about 75-90 degrees Celsius, and to select a duration between about 3-15 minutes. In various embodiments, upon selecting a desired temperature profile, temperature, and/or duration, the heater plate 150 may be configured to reach the desired temperature and maintain a steady-state at the desired temperature for the desired duration, within a determined acceptable temperature tolerance (e.g., within +/−1 degree Celsius, within a standard deviation of 0.3 degrees Celsius over the entire duration, and/or the like).

Substances

Substances (i.e., analytes) that can be detected by the detection device of the invention include for example, pure chemicals, chemical mixtures, cells, cell extracts or tissues, biological agents, such as nucleic acids, enzymes, antibodies and other proteins.

Substances or more typically fluorophores linked to substances absorb and emit light at different wavelengths resulting in fluorescence. Fluorophores can be directly attached to a substance or can be attached indirectly such as to a moiety bound to the substance. Substances can also be detected by a competition format in which a substance competes for binding with a known amount of a molecule binding the same moiety as the substance. Nucleic acids are a preferred class of substance. A preferred detection format involves amplification of a nucleic acid substance and labelling the substance by hybridization with an oligonucleotide probe labelled with a fluorophore. Some exemplary fluorophores are: FAM™, TET™, JOE™, VIC®, HEX™, NED™, PET®, TAMRA™, TET™, and Texas Red®.

Detection of substances can be qualitative (determining presence or absence of substance) or quantitative (determining presence and amount of substance). If the amount of substance is detected, the amount can be absolute (e.g., measured in moles or molarity) or relative to another substance or a control.

Multiple substances as well as positive and/or negative controls can be analyzed in parallel with a multi-substance receptacle means a contiguous vessel that can contain at least two substances such that they can be stored and manipulated in parallel but separately. Standard formats for multi-substance receptacles include 6, 24, 96, 384 or 1536 wells. The volume of each well in an example 96 well format is about 300-400 µL with a working volume of about 75-200 µL. Volumes generally vary inversely with the number of wells, typically in a range between 1 nL and 10 mL for each well, although other sizes are also contemplated. Exemplary wells can have flat bottoms, round bottoms, or V-shaped bottoms among others.

Substances can be detected in a variety of samples including body fluids, such as plasma, serum, whole blood, urine, saliva, cerebrospinal fluid, and semen, cells, cell lysates and tissues. Samples may or may not be subject to purification of a substance to be analyzed before attempted detected of the substance.

Amplification Methods

As noted above, a preferred detection method involves detection of an substance nucleic acid during or after amplification. Amplification refers to either producing an additional copy or copies of all or a segment of a target nucleic acid by template-directed primer extension (target amplification) or amplifying detection signal for qualitatively/quantitatively measurement (signal amplification) or both. Amplification can be performed under temperature cycled or isothermal conditions or combined. Amplification can be linear or exponential.

Many well-known methods of nucleic acid target amplification require thermocycling to alternately denature double-stranded nucleic acids and hybridize primers; however, other well-known methods of nucleic acid amplification are isothermal. The polymerase chain reaction, commonly referred to as PCR (Mullis, 1987 U.S. Pat. No. 4,683,202; Saiki et al., 1985, *Science* (New York, N.Y.), 230(4732), 1350-1354), uses multiple cycles of denaturation, annealing of primer pairs to opposite strands, and primer extension to exponentially increase copy numbers of the target sequence. In a variation called RT-PCR, reverse transcriptase (RT) is used to make a complementary DNA (cDNA) from mRNA, and the cDNA is then amplified by PCR to produce multiple copies of DNA (Gelfand et al., "Reverse Transcription with Thermostable DNA Polymerases—High Temperature Reverse Transcription," (Gelfand, 1994, U.S. Pat. No. 5,322,770; Gelfand & Myers, 1994, U.S. Pat. No. 5,310,652). Another method of amplifying nucleic acid is called the LCR method (ligase chain reaction, Laffler, Carrino, & Marshall, 1993, *Annales De Biologie Clinique*, 51(9), 821-826). LCR (Laffler et al., 1993, *Annales De Biologie Clinique*, 51(9), 821-826) is based on the reaction in which two adjacent probes are hybridized with a target sequence and ligated to each other by a ligase. The two probes could not be ligated in the absence of the target nucleotide sequence, and thus the presence of the ligated product is indicative of the target nucleotide sequence. The LCR method also requires control of temperature for separation of a complementary chain from a template. Another method is strand displacement amplification (George T. Walker, Little, & Nadeau, 1993, U.S. Pat. No. 5,270,184; George T. Walker, 1995, U.S. Pat. No. 5,455,166; G. T. Walker et al., 1992, *Nucleic Acids Research*, 20(7), 1691-1696, 1992, *Proceedings of the National Academy of Sciences of the United States of America*, 89(1), 392-396), commonly referred to as SDA, which uses cycles of annealing pairs of primer sequences to opposite strands of a target sequence, primer extension in the presence of a dNTP to produce a duplex hemiphosphorothioated primer extension product, endonuclease-mediated nicking of a hemimodified restriction endonuclease recognition site, and polymerase-mediated primer extension from the 3' end of the nick to displace an existing strand and produce a strand for the next round of primer annealing, nicking and strand displacement, resulting in geometric amplification of product. Thermophilic SDA (tSDA) uses thermophilic endonucleases and polymerases at higher temperatures in essentially the same method (Fraiser, Spargo, Van, Walker, & Wright, 2002, European Pat. No. 0 684 315). Other amplification methods include: nucleic acid sequence based amplification (Compton, 1991, *Nature*, 350(6313), 91-92, Malek, Davey, Henderson, & Sooknanan, 1992), commonly referred to as NASBA; one that uses an RNA replicase to amplify the probe molecule itself (Lizardi, Guerra, Lomeli, Tussie-Luna, & Russell Kramer, 1988, *Nature Biotechnology*, 6(10), 1197-1202), commonly referred to as Qβ replicase; a transcription-based amplification method (Kwoh et al., 1989, *Proceedings of the National Academy of Sciences of the United States of America*, 86(4), 1173-1177); self-sustained sequence replication (3SR), (Guatelli et al., 1990, *Proceedings of the National Academy of Sciences of the United States of America*, 87(5), 1874-1878; Landgren (1993) *Trends in Genetics* 9, 199-202; and Lee, H. et al., NUCLEIC ACID AMPLIFICATION TECHNOLOGIES (1997)); and, transcription-mediated amplification (Kwoh et al., 1989, *Proceedings of the National Academy of Sciences of the United States of America*, 86(4), 1173-1177; Kacian & Fultz, 1995, U.S. Pat. No. 5,480,784; Kacian & Fultz, 1996, U.S. Pat. No. 5,399,491), commonly referred to as TMA. For further discussion of known amplification methods see Persing, David H., 1993, "In Vitro Nucleic Acid Amplification Techniques" in Diagnostic Medical Microbiology: Principles and Applications (Persing et al., Eds.), pp. 51-87 (American Society for Microbiology, Washington, D.C.). Other illustrative amplification methods suitable for use in accordance with the present invention also include rolling circle amplification (RCA) (Fire & Xu, 1995, *Proceedings of the National Academy of Sciences*, 92(10), 4641-4645; Lizardi, 1998, U.S. Pat. No. 5,854,033); Nucleic Acid Amplification Using Nicking Agents (Van Ness, Galas, & Van Ness, 2006, U.S. Pat. No. 7,112,423); Nicking and Extension Amplification Reaction (NEAR) (Maples et al., 2009, US 2009-0017453 A1); Helicase Dependent Amplification (HDA) (Kong, Vincent, & Xu, 2004, US 2004-0058378 A1; Kong, Vincent, & Xu, 2007 US pat. US2007/0254304 A1); and Loop-Mediated Isothermal Amplification (LAMP) (Notomi & Hase, 2002, U.S. Pat. No. 6,410,278), and Quadruplex priming amplification (Analyst, 2014, 139, 1644-1652). Expar amplification (PNAS Apr. 15, 2003 100, 4504-4509). Cross priming amplification (Sci Rep. 2012; 2: 246). SMAP amplification (Nature Methods April 2007; 4(3):257-62). Multiple displacement amplification (MDA, *Proceedings of the National Academy of Sciences* 2005, 102 (48): 17332-6.), Recombinase Polymerase Amplification (*Journal of Clinical Virology* 54 (4): 308-12). Single primer isothermal amplification (SPIA) (clinical chemistry, 2005 vol. 51 no. 10 1973-1981).

Another aspect of amplification is signal amplification. When a sufficient amount of nucleic acids to be detected is available, there are advantages to detecting that sequence directly, instead of making more copies of that target, (e.g., as in PCR and LCR). Traditional methods of direct detection including Northern and Southern blotting and RNase protection assays usually require the use of radioactivity and are not amenable to automation. Other techniques have sought to eliminate the use of radioactivity and/or improve the sensitivity in automatable formats. The cycling probe reaction (CPR) (Duck, Alvarado-Urbina, Burdick, & Collier, 1990b, *BioTechniques,* 9(2), 142-148), uses a long chimeric oligonucleotide in which a central portion is made of RNA while the two termini are made of DNA. Hybridization of the probe to a target DNA and exposure to a thermostable RNase H causes the RNA portion to be digested. This destabilizes the remaining DNA portions of the duplex, releasing the remainder of the probe from the target DNA and allowing another probe molecule to repeat the process. Branched DNA (bDNA), described by Urdea et al., 1987, *Gene,* 61(3), 253-264, involves oligonucleotides with branched structures that allow each individual oligonucleotide to carry 35 to 40 labels (e.g., alkaline phosphatase enzymes). While this enhances the signal from a hybridization event, signal from non-specific binding is similarly increased. Other signal amplification include: Invasive Cleavage of Nucleic Acids (Prudent, Hall, Lyamichev, Brow, & Dahlberg, 2006, U.S. Pat. No. 7,011,944); Hybridization Chain Reaction (HCR) (R. M. Dirks & Pierce, 2004, *Proceedings of the National Academy of Sciences of the United States of America,* 101(43), 15275-15278, R. Dirks & Pierce, 2012, U.S. Pat. No. 8,105,778) and G-quadruplex DNAzyme-based colorimetric detection. CHA amplification (*J. Am. Chem. Soc.,* 2013, 135 (20), pp 7430-7433). SMART signal amplification (*Biotechniques* 2002 March; 32(3):604-6, 608-11.)

Amplification products can be detected qualitatively (i.e., positive signal relative to control) or quantitatively (signal intensity related to absolute or relative amount of substance giving rise to amplification product). Detection can include but does not require further analysis, such as sequencing of an amplification product. The methods provided by the invention may also include directly detecting a particular nucleic acid in a capture reaction product or amplification reaction product, such as a particular target amplicon or set of amplicons. Accordingly, mixtures of the invention can comprise specialized probe sets including TAQMAN™, which uses a hydrolyzable probe containing detectable reporter and quencher moieties, which can be released by a DNA polymerase with 5'→3' exonuclease activity (Livak, Flood, & Marmaro, 1996, U.S. Pat. No. 5,538,848); molecular beacon, which uses a hairpin probe with reporter and quenching moieties at opposite termini (Tyagi, Kramer, & Lizardi, 1999, U.S. Pat. No. 5,925,517); Fluorescence resonance energy transfer (FRET) primers, which use a pair of adjacent primers with fluorescent donor and acceptor moieties, respectively (Wittwer, Ririe, & Rasmussen, 2001, U.S. Pat. No. 6,174,670); and LIGHTUP™, a single short probe which fluoresces only when bound to the target (Kubista & Svanvik, 2001, U.S. Pat. No. 6,329,144). Similarly, SCORPION™ (Whitcombe, Theaker, Gibson, & Little, 2001, U.S. Pat. No. 6,326,145) and SIMPLEPROBES™ (Wittwer et al., 2003, U.S. Pat. No. 6,635,427) use single reporter/dye probes. Amplicon-detecting probes can be designed according to the particular detection modality used, and as discussed in the above-referenced patents.

The term "multiplex amplification" refers to the amplification of more than one nucleic acid of interest. For example, it can refer to the amplification of multiple sequences from the same sample or the amplification of one of several sequences in a sample as discussed, for example, in George T. Walker, Nadeau, & Little, 1995 U.S. Pat. No. 5,422,252; and George T. Walker, Nadeau, Spears, et al., 1995, U.S. Pat. No. 5,470,723, which provide examples of multiplex strand displacement amplification. The term also refers to the amplification of one or more sequences present in multiple samples either simultaneously or in step-wise fashion.

Real-time amplification refers to an amplification reaction for which the amount of reaction product, i.e. amplicon, is monitored as the reaction proceeds. Forms of real-time amplification differ mainly in the detection mechanisms used for monitoring the reaction products. Detection methods are reviewed in Mackay, Arden, & Nitsche, 2002, *Nucleic Acids Research,* 30(6), 1292-1305, which is incorporated herein by reference. End-point amplification refers to detection of the product after amplification is complete.

Illumination Structure

In various embodiments, the fluorescence reader 1 comprises an illumination structure 200 configured to provide excitation signals (e.g., light signals) to one or more substance samples positioned within corresponding sample wells 1010 positioned within the sample support structure 100. In the illustrated embodiment of FIGS. 2-3, the illumination structure 200 is positioned below the sample support structure 100 (e.g., within the base portion 2 of the fluorescence reader 1), and is defined between an interior top surface (e.g., a bottom surface of the heater plate 150) and one or more perimeter walls 201 (e.g., one or more interior side walls and an interior bottom surface). As discussed herein, the one or more sample wells 1010 supported by the sample support structure are suspended below the interior top surface of the illumination structure, such that one or more sample wells 1010 are at least partially positioned within the illumination structure 200. Moreover, in various embodiments, the interior side walls may have a height of about 2 inches.

In various embodiments, the illumination structure 200 is an enclosed portion configured to prevent and/or impede light from escaping the illumination structure 200, except through the one or more sample well accepting features 110 in the heater plate 150 (defining the interior top surface of the illumination structure 200). Accordingly, light may only escape the illumination structure 200 through one or more sample wells 1010 suspended within the illumination structure 200.

In various embodiments, the illumination structure 200 may comprise an enclosed illumination cavity 220 defined by the one or more perimeter walls 201 and the interior top surface. The perimeter walls 201 and/or the interior top surface may be reflective, for example, to minimize absorption of light emitted into the enclosed illumination cavity 220. For example, one or more of the interior side walls, the interior bottom surface, and/or the interior top surface may comprise a mirror (e.g., mirrored glass), a polished metal (e.g., polished aluminum), and/or the like. As just one example embodiment, the bottom surface of the heater plate 150 (defining an interior top surface of the illumination structure 200) may comprise polished aluminum, and the one or more interior sidewalls and the interior bottom surface may comprise mirrored glass. Accordingly, light present within the illumination structure 200 may be configured to be reflected throughout the enclosed illumination cavity 220 and absorbed only by the one or more sample wells 1010 suspended within the enclosed illumination cavity 220. Moreover, because the interior sidewalls, the interior bottom surface, and/or the interior top surface of the enclosed illumination cavity 220 are reflective, light emitted within the interior of the enclosed illumination cavity 220 is dispersed therein, such that substance samples suspended within respective sample wells 1010 within the enclosed illumination cavity 220 receive at least substantially equal amounts of light (e.g., substantially equal light intensity)

Moreover, in the illustrated embodiment of FIGS. 2-3, the illumination structure 200 comprises one or more light sources 230 configured to provide light within the illumination structure 200. As just one non-limiting example, a plurality of light sources 200 may be positioned within one or more sidewalls of the enclosed illumination cavity 220. For example, a subset of the one or more interior sidewalls (e.g., two opposite and parallel sidewalls) may each define a plurality of holes (e.g., 16) extending therethrough. Light sources 230 (e.g., comprising a light emitter and/or a light filter) may be positioned behind the sidewalls, outside of the interior of the enclosed illumination cavity 220, and aligned with corresponding ones of the holes extending through the sidewalls. In the illustrated embodiment of FIG. 2, a plurality of light sources 230 are positioned within (e.g., behind) parallel side walls positioned on opposite sides of the illumination structure 200.

In various embodiments, the sidewalls comprising the one or more light sources 230 may be positioned more than 1 inch away from a plane tangential to the nearest row of sample well accepting features, such that the light sources 230 are positioned a distance away from the nearest sample wells 1010. Moreover, the holes extending through the sidewalls for enabling light to enter the enclosed illumination cavity 220 may be parallel and positioned within a plane spaced a distance (e.g., at least one inch) below a plane in which a bottom-most end of sample wells 1010 are positioned when such sample wells 1010 are placed within the fluorescence reader 1. Moreover, the light sources 230 may be spaced along a corresponding sidewall at a predefined distance apart (e.g., 4 mm apart center-to-center).

In various embodiments, each of the one or more light sources 230 may comprise a light emitter 231, such as a Light Emitting Diode (LED) consuming less than 1 watt of power (e.g., less than 100 milli-watts, and/or at least approximately 60 milli-watts). In embodiments in which the light emitters 231 are low-power consumption light emitters (e.g., LEDs) the illumination structure 200 need not comprise one or more heat dissipation mechanisms to redirect heat emitted by the light emitters 231. Moreover, LEDs may have a short initialization period, and may reach a steady-state emitted light color quickly (e.g., less than 1 second), thereby enabling fast cycle time between activating and deactivating the one or more light emitters 231.

In various embodiments, the light emitter 231 may be configured to emit a cone of light, for example, having a 30-degree cone angle, through a respective hole in a sidewall of the illumination structure 200 and into the interior of the enclosed illumination cavity 220. In various embodiments, the illumination structure 200 may comprise light emitters 231 configured to emit having a particular light color (e.g., light within a particular range of wavelengths). In various embodiments, the illumination structure 200 may comprise light emitters 231 configured to emit respective colors of light. For example, in various embodiments, the illumination structure 200 may comprise one or more red light emitters 231 (e.g., red LEDs), one or more green light emitters 231 (e.g., green LEDs), one or more blue light emitters 231 (e.g., blue LEDs), and/or one or more yellow light emitters 231 (e.g., yellow LEDs). In various embodiments, the illumination structure 200 may comprise a plurality of each of a variety of colored light emitters 231. With reference briefly to FIG. 7, which illustrates a schematic diagram showing the relative placement of various light emitters 231 relative to a mapped location of various sample wells 1010, the light emitters 231 may be positioned in alternating alignment along a sidewall, such that the colors of the light emitters 231 are alternated along the length of the sidewall. Moreover, as shown in FIG. 7 the light emitters 231 arranged on a first sidewall may be arranged in an opposite order from the light emitters 231 arranged on a second sidewall positioned opposite the first sidewall. For example, for a light emitter arrangement of (1) red LED, (2) green LED, (3) blue LED, (4) Yellow LED along a first sidewall, the light emitters are arranged (1) Yellow LED, (2) blue LED, (3) green LED, (4) red LED along a second sidewall opposite the first sidewall. Accordingly, the red LED of the first sidewall may be aligned with the Yellow LED of the second sidewall, the green LED of the first sidewall may be aligned with the blue LED of the second sidewall, the blue LED of the first sidewall may be aligned with the green LED of the second sidewall, and the Yellow LED of the first sidewall may be aligned with the red LED of the second sidewall.

As just one non-limiting example, an illumination structure 200 may comprise a total of 32 light emitters 231 comprising 4 sets of 8 light emitters 231 configured to emit a corresponding color of light.

In various embodiments, the one or more light sources 230 may comprise respective light filters 232, such that each light emitter 231 may be configured to emit light through a respective light filter 232. Each light filter 232 may be configured to permit light within a narrow range of wavelengths to enter the interior of the enclosed illumination cavity 220. In various embodiments, the light filters 232 may define a variety of narrow wavelength windows permitting light having a wavelength within one of the wavelength windows to pass therethrough. Accordingly, a single filter material may be configured to permit light within a first range of wavelengths to pass therethrough (e.g., red light) and light within a second range of wavelengths to pass therethrough (e.g., green light).

The light filters 232 may be arranged relative to various light emitters such that a light filter 232 corresponds to a particular light emitter 231 such that a majority of light emitted by a light emitter 231 is permitted to pass through a corresponding light filter 232. For example, a red light filter 232 may be arranged with a red LED, a blue light filter 232 may be arranged with a blue LED, a green light filter 232 may be arranged with a green LED, and/or a yellow light filter 232 may be arranged with a yellow light filter. In various embodiments, each light filter 232 is configured to permit a narrow band of light (e.g., wavelengths within a range of wavelengths approximately 20-30 nm wide) to pass therethrough, and accordingly, a portion of light emitted by a particular light emitter 231 may be prevented from passing through the light filter 232.

As a specific and non-limiting example configuration, red LEDs may be arranged to emit light through a first filter material configured to permit red and green light to pass therethrough; green LEDs may be arranged to emit light through the first filter material; blue LEDs may be arranged to emit light through a second filter material configured to permit blue and yellow light to pass therethrough; and yellow LEDs may be arranged to emit light through the second filter material. Accordingly, the red LEDs arranged with the first filter material may be configured to permit Cy5 light having a wavelength between about 646-662 nm to enter the illumination structure, the green LEDs arranged with the first filter material may be configured to permit HEX light having a wavelength between about 535-556 nm to enter the illumination structure, the blue LEDs arranged with the second filter material may be configured to permit FAM light having a wavelength between about 495-520 nm to enter the enclosed illumination cavity 220, and the yellow LEDs arranged with the second filter material may be configured to permit ROX light having a wavelength between about 576-601 nm to enter the enclosed illumination cavity 220. However, it should be understood that this configuration is merely exemplary, and any of a variety of configuration may be configured to permit light within various ranges of wavelengths to enter the enclosed illumination cavity 220.

Moreover, in various embodiments, the various light emitters 231 may be configured to illuminate (and provide light into the enclosed illumination cavity 220) alternatively, such that only light within a particular range of wavelengths enters the enclosed illumination cavity 220 at a particular time. The light emitters 231, together with the controller, may be configured to cycle through various colors of light presented to the interior of the enclosed illumination cavity 220, for example, to monitor the fluorescence of substance sample positioned within the sample wells 1010 when subject to various colors of light.

In various embodiments, the one or more light sources 230 may be in electronic communication with the controller, which may be configured to selectively illuminate the light sources 230 (e.g., by transmitting electrical signals to the light sources 230) in order to provide a desired excitation light color (wavelength) to one or more substance samples positioned within the fluorescence reader 1. For example, the controller may be configured to illuminate each color (wavelength) light sources 230 in the alternative for a predefined period (e.g., 15 seconds) before switching to illuminate a different color light sources 230 for the predefined period. Accordingly, the controller may be configured to illuminate the various colors of light sources 230 in the alternative and in a cycle, such that each color of light sources are illuminated during the cycle for the predefined period of time. In certain embodiments, the controller may be configured to illuminate a plurality of light source colors (e.g., all light sources 230) simultaneously, thereby illuminating the one or more substance samples with white light and/or light comprising a variety of colors (wavelengths) simultaneously. Accordingly, as discussed in greater detail herein, the imaging structure 300 may be configured to capture image data of the one or more substance samples while the one or more substance samples are exposed to each color (wavelength) of excitation light.

Imaging Structure

As shown in FIG. 3, the fluorescence reader 1 may additionally comprise an imaging structure 300 configured to monitor an emitted fluorescence of various substance samples positioned within respective sample wells 1010. In the illustrated embodiment of FIG. 3, the imaging structure 300 is positioned above the sample support structure 100, on an opposite side of the sample support structure 100 from the illumination structure 200. In various embodiments, the imaging structure may be positioned within the interior of the housing 4 of the fluorescence reader 1, such that the imaging structure 300 is not exposed to light generated external to the fluorescence reader 1. Moreover, as shown in FIG. 3, the imaging structure 300 may be positioned above the opaque hood 3, which may have an open top end permitting to travel from the sample support structure 100, through the opaque hood 3, through a portion of the housing 4, and to be received by one or more imaging devices 310. Moreover, in the illustrated embodiment of FIG. 3, the imaging structure 300 may comprise a reflective member 305 configured to redirect light from the sample support structure 100 to the imaging device 310. Accordingly, the imaging device need not be positioned directly in line with the sample support structure 100 in order to receive fluorescence emissions from the substance samples positioned in respective sample wells 1010.

Moreover, the imaging structure 300 may be isolated from the illumination structure 200, such that light cannot pass from the illumination structure 200 to the imaging structure 300 except through the one or more sample well accepting features defined in the sample support structure 100 (and therefore through the sample wells 1010 and substance samples contained therein). Accordingly, at least substantially all light detected by the imaging structure may originate from and/or pass through one or more substance samples positioned in sample wells 1010 supported by the sample support structure 100.

As discussed herein, the hood 3 of the fluorescence reader 1 may be configured to be movable relative to the base portion 2 to enable access to the interior of the fluorescence reader 1. In various embodiments, the imaging structure 300 may be secured relative to the lid portion, and accordingly may be configured to move as the lid portion moves. However, as discussed above, the imaging structure may be secured relative to the housing 4, such that the hood 3 moves relative to both the base portion 2 and the imaging structure 300 when the hood 3 is moved between the closed configuration and the open configuration.

The imaging structure 300 may comprise one or more imaging devices 310 configured to periodically and/or continuously capture image data. For example, the imaging devices 310 may each be defined as a Complementary Metal-Oxide Semiconductor (CMOS) chip (camera), a Charge Coupled Device (CCD) chip (camera), and/or the like. The one or more imaging devices 310 may be configured to generate image data indicative of the location of detected light, an intensity of detected light, a color (wavelength) of detected light, and/or the like. Accordingly, the image data may comprise a picture, a video, and/or the like. In various embodiments, the one or more imaging devices 310 may collectively define a field of view (FOV) associated with the one or more imaging devices 310. The FOV of the one or more imaging devices 310 may define the area from which the one or more imaging devices 310 are configured to capture image data. In various embodiments, the imaging structure 300 may be configured such that the combined FOV of the included one or more imaging devices 310 at least encompasses all of the sample well accepting features 111 in the sample support structure 100. Accordingly, the one or more imaging devices 310 may be configured to capture image data corresponding to all of the sample wells 1010 (and corresponding substance samples) supported within the fluorescence reader 1.

In various embodiments, the imaging structure 300 may additionally comprise one or more light filters 315 similar to those discussed above in relation to the illumination structure 200. The light filters 315 may be configured to permit light within a predefined range of wavelengths to pass therethrough. In various embodiments, the one or more light filters 315 may be positioned in an active position within the FOV of the one or more imaging devices 310, between the sample support structure 100 and the one or more imaging devices 310, such that the imaging devices 310 receive only light passing through the light filters 315. In various embodiments, the one or more light filters 310 may comprise a first light filter 315 configured for permitting light within one or more predefined wavelength ranges to pass through, and a second light filter 315 configured for permitting light within one or more second predefined wavelength ranges to pass through. For example, the first light filter 315 may be configured to permit blue light and yellow light to pass through, and the second light filter 315 may be configured to permit red light and green light to pass through. In certain embodiments, the one or more light filters 315 may comprise a first light filter 315 configured to permit blue light to pass through, a second light filter 315 configured to permit yellow light to pass through, a third light filter 315 configured to permit green light to pass through, and a fourth light filter 315 configured to permit red light to pass through.

In various embodiments, the one or more light filters 315 may be movable relative to the one or more imaging devices 310 between the active position within the FOV of the one or more imaging devices 310 and an inactive position outside of the FOV of the one or more imaging devices 310. Accordingly, one of the one or more light filters 315 may be selectably positioned in the active position within the FOV of the one or more imaging devices 310 based on a desired range of wavelengths of light to be detected by the imaging device 310. For example, a light filter 315 permitting blue light to pass through may be positioned between the one or more imaging devices 310 and the sample support structure 100 in order to detect blue light fluoresced by the one or more substance samples. In various embodiments, the one or more light filters 315 may be movable via a powered light filter mount, configured to be movable by an actuator (e.g., a motor, a solenoid, and/or the like). In such embodiments, the actuator may be in electronic communication with the controller in order to control which light filter 315 is positioned in the active position and which light filter 315 is in the inactive position.

However, in various embodiments comprising a plurality of imaging devices 310, each imaging device 310 may be associated with a corresponding light filter 315 configured to permit one or more predefined wavelengths of light to pass therethrough. For example, a first imaging device 310 may be associated with a first light filter 315 configured to permit blue light and yellow light to pass through, and a second imaging device 310 may be associated with a second light filter 315 configured to permit green light and red light to pass through. In such embodiments, the controller may be configured to selectively activate the plurality of imaging devices 310 such that an imaging device 310 associated with a particular light filter 315 configured to enable a desired light color to pass through is activated in order to sense the desired light color.

In various embodiments, at least one of the one or more imaging devices 310 may be positioned directly above the sample plate 1000, with a corresponding FOV extending at least substantially vertically downward toward the sample support structure 100. However, in certain embodiments, at least one of the one or more imaging devices 310 may be positioned above the sample support structure 100, with a FOV extending neither parallel nor perpendicular to the sample support structure. For example, at least one imaging device 310 may be positioned proximate an upper corner of the interior of the fluorescence reader 1.

In various embodiments, one or more of the interior surfaces of the imaging structure 300 (e.g., the interior surface of the opaque hood 3) may be configured to absorb light directed thereon. For example, the interior surfaces of the opaque hood 3 may have an emissivity of about 1.0. Accordingly, the imaging structure 300 may be configured such that the one or more imaging devices 310 are configured to capture imaging data indicative of the fluorescence of one or more substance samples positioned in respective sample wells 1010, without detecting significant light reflected from interior surfaces of the imaging structure 300.

In various embodiments, the imaging structure 300 may be in electronic communication with the controller, which may be configured to transmit one or more electronic signals to the imaging structure 300 to capture image data. As discussed herein, the controller may be configured to transmit one or more electronic signals to the imaging structure 300 to continuously capture image data (e.g., a video) and/or the periodically capture image data (e.g., a plurality of still-frame images). For example, the imaging structure 300 may be configured to capture image data every second, half-second, 5 seconds, 15 seconds, and/or the like. Thus, for example, the controller may be configured to transmit a signal to the imaging structure 300 to capture image data one or more times during each time period in which a particular excitation light color (wavelength) is being applied to the substance samples. As a specific example, the controller may be configured to transmit an electronic signal to the one or more light sources 230 to illuminate to apply a particular color of excitation light to the substance samples, and subsequently (and/or consecutively) transmit an electronic signal to the imaging structure 300 to capture one or more images while the particular color of excitation light is applied to the substance samples. In various embodiments, the controller may be configured to instruct the imaging structure 300 to capture image data each time the color (wavelength) of the excitation light applied to the substance samples is changed.

Moreover, in various embodiments, the fluorescence reader 1 may comprise one or more processing entities configured to analyze the image data captured by the imaging structure 300 in order to generate fluorescence data indicative of a fluorescence intensity emitted by one or more substance samples. In various embodiments, the controller discussed herein may be configured to analyze the image data and/or a separate computing device may be configured to analyze the image data in order to generate the fluorescence data. In various embodiments, the resulting generated fluorescence data may comprise a single value indicative of the intensity of the fluorescence emitted by each substance sample. The generated fluorescence data may be output in a chart, in matrix form, as a list, and/or the like. In various embodiments, the generated fluorescence data may be correlated with data indicative of the identity of the substance sample corresponding to a particular fluorescence data value. For example, each sample well (and/or each sample well accepting feature in the sample support structure) may have a corresponding label, such that the fluorescence values may be correlated with a particular label to convey data indicative of the fluorescence intensity of each substance sample. For example, for a 96-well sample plate, each sample well 1010 may be mapped (as shown in FIG. 7) such that each row of substance samples may have a corresponding letter label (e.g., A, B, C, D, and/or the like), and each column may have a corresponding number label (e.g., 1, 2, 3, 4, and/or the like). Accordingly, a particular sample well 1010 may be identified based on a particular row label and column label. For example, a sample well 1010 located in the fourth row and the fourth column of the plate may be identified as sample well D-4. Accordingly, a given fluorescence value may be generated and associated with a given sample well label (e.g., D-4) in order to convey data indicative of the fluorescence of a particular substance sample in a particular sample well 1010.

Example Method of Use

An example method of using a fluorescence reader 1 as discussed herein to determine the fluorescence of one or more substance samples will now be described with reference to a 96-well sample plate 1000. However, as discussed herein, sample plates 1000 having any number of sample wells 1010 may be utilized.

In various embodiments, the fluorescence reader 1 may be opened to enable access to the interior of the fluorescence reader 1. As discussed herein, the hood 3 may be moved (e.g., lifted, rotated, pivoted, and/or the like) relative to the base portion 2 to open the fluorescence reader 1. A sample plate 1000 containing one or more substance samples in respective sample wells 1010 may then be inserted into the fluorescence reader 1 such that the sample wells 1010 of the sample plate 1000 align with the sample well accepting features 111 of the sample support structure 100. The sample plate 1000 may then be lowered into the fluorescence reader 1 such that a bottom portion of the sample wells 1010 extend below a bottom surface of the sample support structure 100 (e.g., a bottom surface of a heater plate 150), such that the bottom portion of the sample wells 1010 are suspended below the sample support structure 100 and within an enclosed illumination cavity 220 of the fluorescence reader 1. The fluorescence reader 1 may then be closed, for example, by moving the hood 3 relative to the base portion 2. As discussed herein, movement of the hood 3 to the closed configuration may cause a portion of the hood 3 (e.g., plate engagement features 31) to engage a sample plate 1000 positioned within the fluorescence reader 1 to depress the sample plate 1000 against the sample support structure 100. In various embodiments, the fluorescence reader 1 may be secured in the closed configuration, for example, by one or more locking mechanisms.

Figure 8:
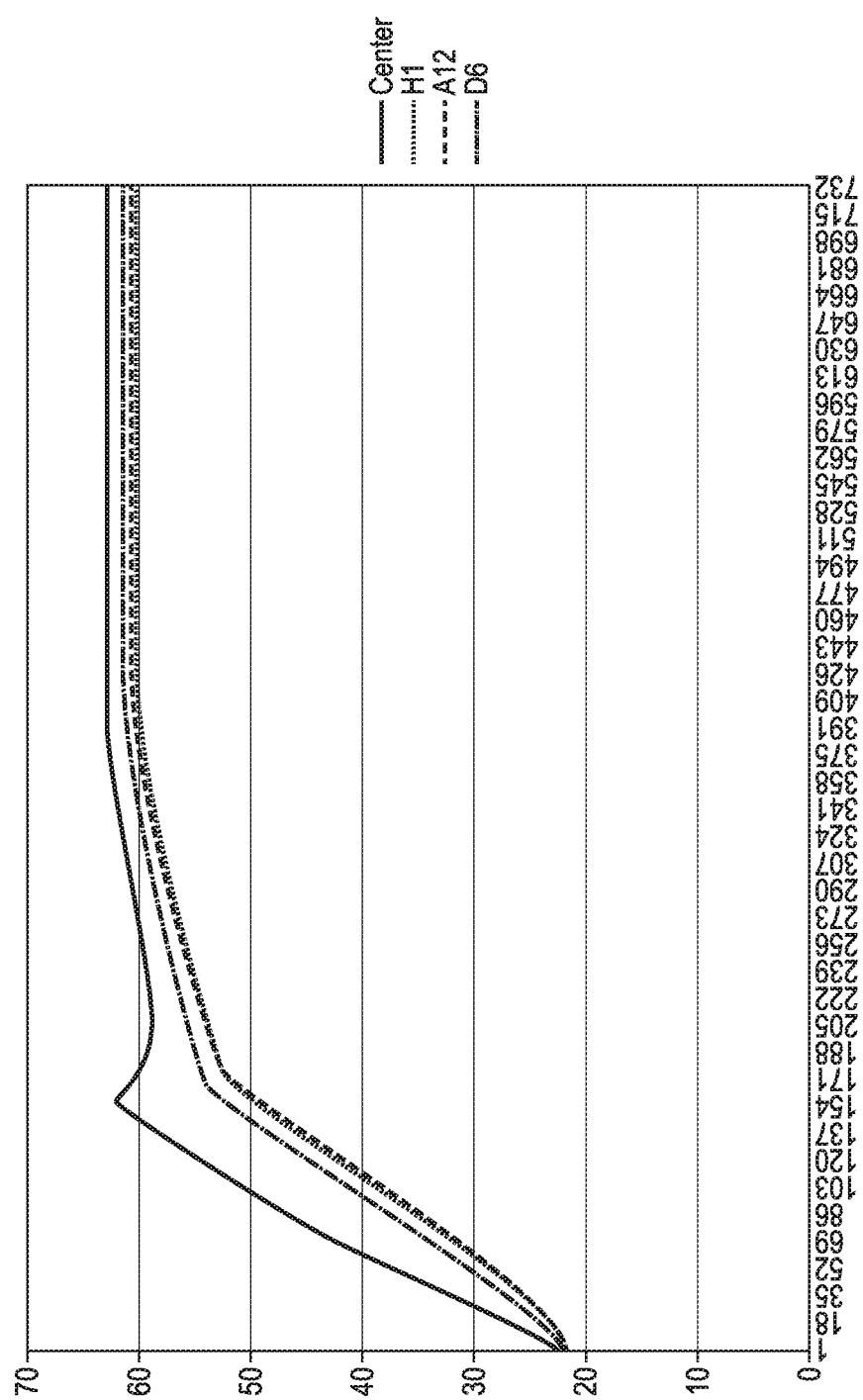
FIG. 8 is a temperature profile graph illustrating a measured temperature at various locations on a heater plate over time.
Figure 9:
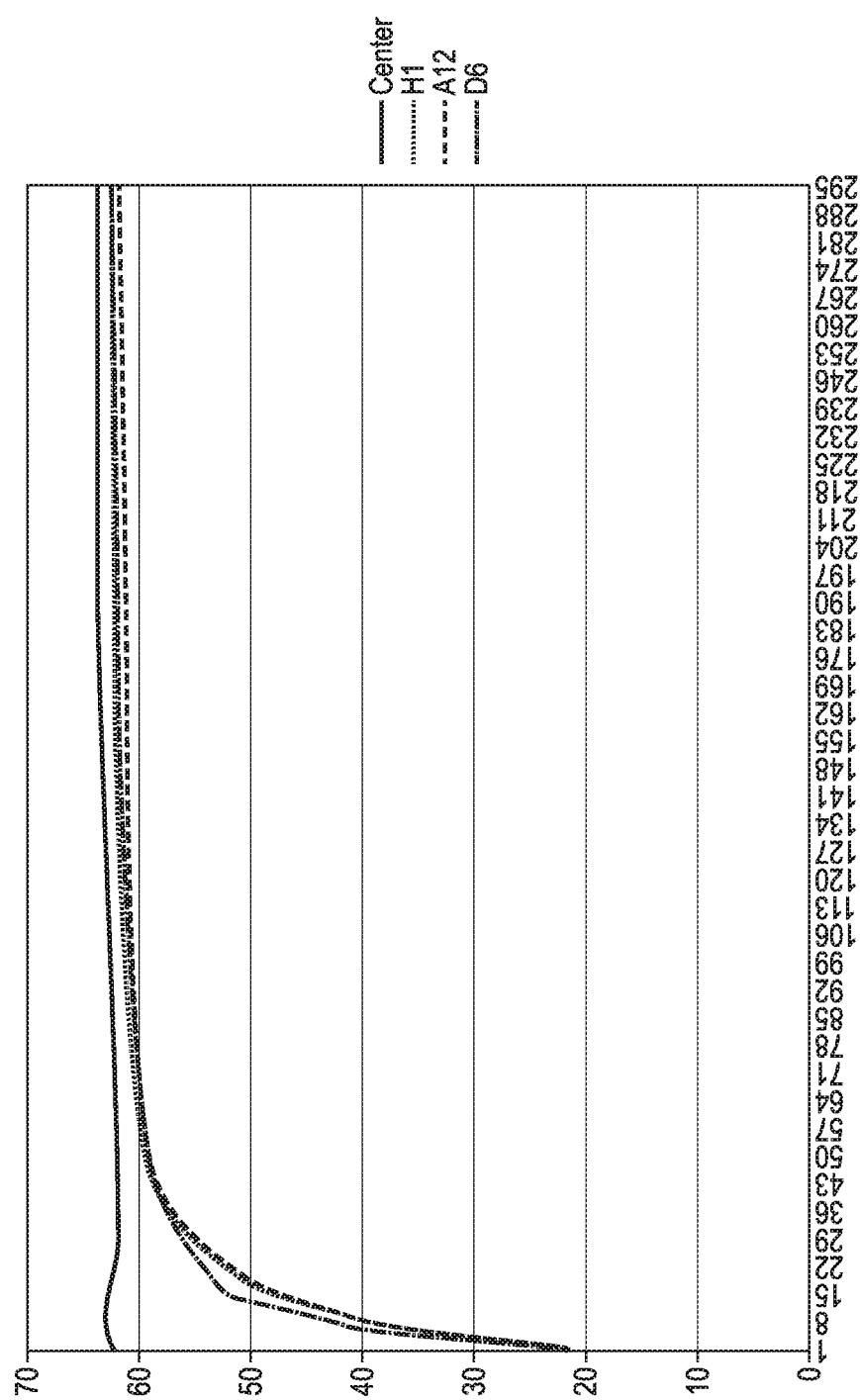
FIG. 9 is a temperature profile graph illustrating a measured temperature at various locations on a heater plate over time.

In various embodiments, the heater plate 150 may be configured to heat the substance samples to a predefined temperature. As discussed herein, the predefined temperature may be selected based on user input provided to a controller (e.g., via a user interface). In various embodiments, the heater plate may be configured to heat the substance samples to the predefined temperature gradually (e.g., between about 5 minutes and 30 minutes). Heating the substance samples gradually, and thereby using a long-duration transient temperature period, facilitates even heating of all substance samples positioned within a sample plate. For example, as shown in FIG. 8, which displays a temperature profile of the heater plate 150 at various locations on the surface of the heater plate 150, indicates that the temperature of the heater plate 150 and the corresponding temperature of samples positioned in various sample wells 1010 (at particular mapped locations, as indicated at FIG. 7) may provide substantially even heating across a plurality of substance samples at various locations within the sample plate 1000. Similarly, FIG. 9 indicates that the temperatures of various substance samples may vary substantially evenly when the heater plate has been preheated prior to insertion of the sample plate 1000 therein. Accordingly, substance samples positioned in sample wells 1010 located proximate heating elements 151 are not heated to a temperature substantially higher than substance samples positioned in sample wells 1010 located farther from the heating elements 151.

In various embodiments, during the transient temperature period and/or after the temperature of the substance samples reaches a desired predetermined temperature, the fluorescence reader 1 may be configured to emit excitation light to the one or more substance samples. As discussed herein, the excitation light may be emitted by one or more light sources 230 located within the illumination structure 200 below the sample support structure 100 and into the enclosed illumination cavity 220. In various embodiments, the illumination structure 200 may be configured to emit one or more colors (wavelengths) of light consecutively and/or simultaneously. As discussed herein, the illumination structure 200 may be configured to emit light having a desired wavelength by selectively activating one or more light sources 230 (e.g., LEDs and corresponding light filters 232) configured to permit light within the desired range of wavelengths to enter the enclosed illumination cavity 220. Moreover, in various embodiments, the interior of the enclosed illumination cavity 220 may comprise one or more reflective surfaces, thereby enabling the excitation light to be reflected through the enclosed illumination cavity 220 until being absorbed by the one or more substance samples. Because the interior of the enclosed illumination cavity 220 is reflective, at least substantially all of the light generated by the light sources 230 is absorbed by the one or more substance samples. Moreover, because the interior of the enclosed illumination cavity 220 is reflective, the light generated by the light sources 230 is dispersed at least substantially equally across all of the substance samples, such that each of the substance samples receives an at least substantially equal intensity of light. Moreover, as discussed herein, the one or more light sources 230 may be positioned in vertical sidewalls of the enclosed illumination cavity 220, such that light is emitted at least substantially perpendicularly to the length of the sample wells 1010. Accordingly, substantially all light detected by the imaging structure 300 is light fluoresced by the substance samples, rather than being redirected light emitted by the one or more light sources 230.

In various embodiments, the fluorescence reader 1 may be configured to emit a plurality of colors (wavelengths) of light to be received by the one or more substance samples, for example, in a cycle. For example, the fluorescence reader 1 may be configured to emit light of a first color (wavelength) from the illumination structure 200 for a predetermined duration before switching to emit light of a second color (wavelength) from the illumination structure 200. As a non-limiting example, the fluorescence reader 1 may be configured to emit four different colors (wavelengths) of light in the alternative during a cycle, wherein each light color is emitted for a predefined duration (e.g., 15 seconds) before switching to the next color. The cycle may be repeated for a predefined duration.

While the illumination structure 200 is emitting light to the one or more substance samples, the imaging structure 300 may be configured to capture image data indicative of the color and/or intensity of fluorescence emitted by the one or more substance samples exposed to the emitted light. In various embodiments, the imaging structure 300 may comprise one or more light filters 315 to isolate a predefined range of wavelengths of light desired to be detected during a particular duration. In one example embodiment, the imaging structure 300 may comprise two light filters 315 that may be selectably moved to an active position within the FOV of an imaging device 310, such that fluorescence detected by the imaging device 310 passes through the light filter 315 in the active position. In various embodiments, the fluorescence reader 1 (e.g., the controller) may be configured to switch the one or more light filters 315 to the active position such that the movement of the one or more light filters 315 is at least substantially synchronized with the changing of light color emitted by the illumination structure 200. As a specific example, an illumination structure 200 may be configured to emit four different light colors in a cycle in the following order: (1) blue, (2) green, (3) yellow, (4) red, and the imaging structure 300 may comprise two light filters 315, a first light filter 315 configured to permit blue and yellow light to pass therethrough and a second light filter 315 configured to permit green and red light to pass therethrough. The imaging structure 300 may be configured to position the first light filter 315 in the active position while the illumination structure 200 emits either blue or yellow light, and the second light filter 315 in the active position while the illumination structure 200 emits either green or red light. Accordingly, at the time the illumination structure 200 switches between emitting blue light and green light, the imaging structure 300 may be configured to switch the first light filter 315 to an inactive position outside of the FOV of the imaging device 310 while simultaneously switching the second light filter 315 to the active position. Similarly, while the illumination structure 200 switches between emitting green light and yellow light, the imaging structure 300 may be configured to switch the second light filter 315 to the inactive position while simultaneously switching the first light filter 315 to the active position.

As mentioned herein, the imaging structure 300 may be configured to periodically and/or continuously capture image data indicative of the intensity and/or color of fluorescence of the substance samples. The imaging structure 300 may be configured to analyze the image data in order to identify the intensity and/or color of fluorescence emitted by each individual substance sample visible in the image data. For example, the capture imaging data may comprise data indicative of the color and/or intensity of fluorescence detected in a plurality of pixels. The imaging structure 300 may be configured to correlate the location of each of the plurality of pixels with the location of one or more sample wells 1010 visible within the image data in order to identify the portion of image data corresponding to each individual substance sample. In various embodiments, the imaging structure 300 may be configured to convert the image data into a single value indicative of the color and/or intensity of fluorescence emitted by each substance sample. For example, the imaging structure 300 may be configured to identify an average color and/or intensity of fluorescence detected at each pixel corresponding to a particular substance sample well 1010 in order to generate a single value indicative of the fluorescence intensity and/or color emitted by the substance sample in the particular sample well 1010.

In various embodiments, the fluorescence reader 1 may be configured to provide an output indicative of the determined fluorescence intensity and/or color identified for each sample well. For example, the fluorescence reader 1 may be configured to print a report indicative of fluorescence characteristics detected for each substance sample, to generate a user interface displayable via a graphical display (e.g., a computer monitor) indicative of the fluorescence characteristics detected for each substance sample, and/or the like. Moreover, in various embodiments, the fluorescence reader 1 may define one or more alert thresholds configured for generating an alert if one or more substance samples exhibits fluorescence characteristics outside of a desired and/or expected range. For example, the fluorescence reader 1 may be configured to generate an alert upon a determination that one or more substance samples emitted fluorescence at an intensity below a given threshold and/or above a given threshold.

Upon completion of a desired fluorescence measurement for substance samples within a particular sample plate 1000. The fluorescence reader 1 may be opened by moving the hood 3 of the fluorescence reader 1 to the open configuration. The sample plate 1000 may then be removed by lifting the sample plate 1000 away from the sample support structure 100 and out of the fluorescence reader 1. If desired, a new sample plate 1000 may be inserted, and the process may be repeated for substance samples contained in the newly inserted sample plate 1000.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. Any patent filing, reference, website, or accession number or the like cited in this application is hereby incorporated by reference in its entirety for all purposes to the same extent as if so individually denoted. To the extent any citation is associated with different content at different times, the content in effect at the effective filing date is intended, the effective filing date being the actual filing date or date of the earliest priority application making the citation, whichever is earlier. Unless otherwise apparent from the context any embodiment, aspect, feature, step or the like can be used in combination with any other.

Although the foregoing description indicates the illumination structure 200 is positioned below the sample support structure 100 and the imaging structure 300 is positioned above the sample support structure 100, it should be understood that, in various embodiments, the illumination structure 200 may be positioned above the sample support structure 100 and the imaging structure 300 may be positioned below the sample support structure 100. In such embodiments, the imaging structure 300 may be configured to monitor the relative fluorescence of the various substance samples through the bottom portion of the sample wells 1010, and the illumination structure 200 may be configured to direct excitation signals into an upper portion of the sample wells 1010.

That which is claimed:
1. A fluorescence reader for assessing a fluorescence intensity for one or more substance samples, the fluorescence reader comprising:
   a sample support structure defining one or more sample well accepting features each configured to support a sample well configured to contain a corresponding substance sample;
   an illumination structure positioned below the sample support structure and configured to illuminate one or more substance samples positioned within corresponding sample wells, the illumination structure comprising:
- one or more perimeter walls, wherein the one or more perimeter walls and the sample support structure collectively define an enclosed illumination cavity and wherein at least one of the one or more perimeter walls comprises a reflective surface; and
- one or more visible light sources positioned within the enclosed illumination cavity; and an imaging structure positioned above the sample support structure and configured to detect a fluorescence emitted by the one or more substance samples illuminated by the illumination structure.

2. The fluorescence reader of claim 1, wherein the sample support structure comprises a heater plate configured to heat the one or more substance samples positioned within corresponding sample wells.

3. The fluorescence reader of claim 2, wherein the heater plate comprises:
- a metal plate defining a cavity corresponding to each of the one or more sample well accepting features, each cavity extending through the metal plate and having a tapered interior surface configured to contour to an exterior surface of a sample well positioned within the cavity; and
- one or more heating elements configured to transfer heat to the metal plate.

4. The fluorescence reader of claim 3, wherein the one or more heating elements are resistance heaters.

5. The fluorescence reader of claim 2, wherein the one or more perimeter walls and the heater plate collectively define the enclosed illumination cavity, and
- wherein the heater plate defines a cavity corresponding to each of the one or more sample well accepting features, each cavity extending through the heater plate such that a bottom surface of a sample well positioned within a cavity is suspended below the heater plate and within the illumination cavity.

6. The fluorescence reader of claim 1, wherein the one or more perimeter walls comprise one or more side walls and a floor, and
- wherein the one or more light sources are positioned within at least one of the one or more side walls.

7. The fluorescence reader of claim 1, wherein the one or more light sources comprises one or more first light sources configured to emit visible light having a first color, and one or more second light sources configured to emit visible light having a second color.

8. The fluorescence reader of claim 7, wherein the one or more first light sources comprise one or more first light filters configured to permit the visible light having the first color to pass into the illumination cavity, and the one or more second light sources comprise one or more second light filters configured to permit the visible light having the second color to pass into the illumination cavity.

9. The fluorescence reader of claim 1, wherein the one or more light sources comprise light emitting diodes.

10. The fluorescence reader of claim 1, wherein the imaging structure comprises:
- an opaque hood forming an imaging cavity collectively with the sample support structure, wherein the imaging cavity prevents light from entering the imaging cavity from the exterior of the fluorescence reader; and
- an imaging device positioned within the imaging cavity and configured to detect the fluorescence emitted by the one or more substance samples illuminated by the illumination structure.

11. The fluorescence reader of claim 10, wherein the imaging device is selected from:
- a Charge Coupled Device camera or a Complementary Metal-Oxide Semiconductor camera.

12. The fluorescence reader of claim 10, wherein the imaging device comprises one or more light filters configured to selectively permit light within one or more wavelength ranges to be detected by the imaging device.

13. The fluorescence reader of claim 12, wherein the imaging device comprises two or more light filters configured to be alternatively positioned in an active position to selectively permit light within one or more wavelength ranges to be detected by the imaging device while positioned in the active position.

14. A method for assessing a fluorescence intensity of one or more substance samples, the method comprising steps for:
- positioning a sample plate within a sample support structure, wherein the sample plate defines one or more sample wells each containing a substance sample therein, and the sample support structure defines one or more sample well accepting features each configured to support a sample well therein such that a bottom portion of the sample well is suspended within an illumination cavity defined below the sample support structure;
- illuminating the sample plate by emitting visible light from one or more light sources into the illumination cavity, wherein the illumination cavity is enclosed by one or more reflective perimeter walls and a bottom surface of the sample support structure; and
- imaging a top portion of the sample plate by capturing image data from an imaging device positioned above the sample support structure.

15. The method of claim 14, further comprising identifying an intensity of fluorescence emitted by substance samples positioned within one of more of the sample wells.

16. The method of claim 14, further comprising heating the substance samples contained within the one or more sample wells to a desired temperature.

17. The method of claim 14, wherein the one or more light sources comprises one or more first light sources configured for emitting visible light in a first color and one or more second light sources configured for emitting visible light in a second color, and wherein emitting visible light from one or more light sources into the illumination cavity comprises emitting visible light from the one or more first light sources in the first color into the illumination cavity.

18. The method of claim 17, wherein the one or more first light sources comprise a first light filter configured to permit visible light in the first color to pass into the illumination cavity and the one or more second light sources comprise a second light filter configured to permit visible light in the second color to pass into the illumination cavity.

19. The method of claim 17, wherein the imaging device is associated with one or more first light filters configured to permit visible light in the first color to be detected by the imaging device and one or more second light filters configured to permit visible light in the second color to be detected by the imaging device, and wherein imaging a top portion of the sample plate comprises positioning the first light filter in an active position to permit the first light color to be detected by the imaging device.

20. The method of claim 14, further comprising steps for:
associating a portion of the image data with a particular sample well of the one or more sample wells; and
determining a fluorescence intensity emitted by the sample in the particular sample well based at least in part on the portion of the image data.

* * * * *